(12) United States Patent
Wei et al.

(10) Patent No.: US 10,481,863 B2
(45) Date of Patent: Nov. 19, 2019

(54) SYSTEMS AND METHODS FOR IMPROVED USER INTERFACE

(71) Applicant: Baidu USA, LLC, Sunnyvale, CA (US)

(72) Inventors: Zhuxiaona Wei, Mountain View, CA (US); Thuan Nguyen, Milpitas, CA (US); Iat Chan, Hayward, CA (US); Kenny M. Liou, San Jose, CA (US); Helin Wang, Sunnyvale, CA (US); Houchang Lu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 71 days.

(21) Appl. No.: 15/621,647

(22) Filed: Jun. 13, 2017

(65) Prior Publication Data

US 2018/0011688 A1 Jan. 11, 2018

Related U.S. Application Data

(60) Provisional application No. 62/359,157, filed on Jul. 6, 2016.

(51) Int. Cl.
*G06F 3/16* (2006.01)
*G06F 3/0488* (2013.01)
(Continued)

(52) U.S. Cl.
CPC ............ *G06F 3/167* (2013.01); *G06F 3/0233* (2013.01); *G06F 3/04883* (2013.01);
(Continued)

(58) Field of Classification Search
CPC ... G06F 3/04886; G06F 3/167; G06F 3/04883
See application file for complete search history.

(56) References Cited

U.S. PATENT DOCUMENTS 5,864,803 A * 1/1999 Nussbaum ............ G10L 15/063
704/232
6,021,387 A * 2/2000 Mozer .................... G10L 15/16
704/232
(Continued)

FOREIGN PATENT DOCUMENTS

| CN | 303508290 | 12/2015 |
|---|---|---|
| CN | 303691616 | 6/2016 |
| CN | 303728538 | 6/2016 |

OTHER PUBLICATIONS

Sak Hasim et al.; Learning Acoustic frame labeling for speech recognition with recurrent neural networks; 2015; IEEE International Conference; whole document (Year: 2015).*
(Continued)

*Primary Examiner* — Phenuel S Salomon
(74) *Attorney, Agent, or Firm* — North Weber & Baugh LLP

(57) ABSTRACT

Aspects of the present disclosure relate to systems and methods for a voice-centric virtual or soft keyboard (or keypad). Unlike other keyboards, embodiments of the present disclosure prioritize the voice keyboard, meanwhile providing users with a quick and uniform navigation to other keyboards (e.g., alphabet, punctuations, symbols, emoji's, etc.). In addition, in embodiments, common actions, such as delete and return are also easily accessible. In embodiments, the keyboard is also configurable to allow a user to organize buttons according to their desired use and layout. Embodiments of such a keyboard provide a voice-centric, seamless, and powerful interface experience for users.

20 Claims, 14 Drawing Sheets

(51) Int. Cl.
  *G06F 3/023* (2006.01)
  *G10L 15/16* (2006.01)
  *G10L 15/02* (2006.01)

(52) U.S. Cl.
  CPC .......... *G06F 3/04886* (2013.01); *G10L 15/16* (2013.01); *G10L 15/02* (2013.01)

(56) References Cited

U.S. PATENT DOCUMENTS

| | | | |
|---|---|---|---|
| 6,292,772 B1* | 9/2001 | Kantrowitz | G06F 17/275 382/230 |
| 6,587,132 B1* | 7/2003 | Smethers | G06F 3/04892 345/160 |
| D480,401 S | 10/2003 | Kahn | |
| 7,035,802 B1* | 4/2006 | Rigazio | G06F 16/322 704/256 |
| 7,251,367 B2* | 7/2007 | Zhai | G06K 9/222 382/229 |
| 8,095,364 B2* | 1/2012 | Longe | G10L 15/24 704/257 |
| D663,739 S | 7/2012 | Weir | |
| D671,558 S | 11/2012 | Anzures | |
| D677,689 S | 3/2013 | Davis | |
| D679,725 S | 4/2013 | Tanghe | |
| D681,663 S | 5/2013 | Phelan | |
| D683,752 S | 6/2013 | Carpenter | |
| D687,452 S | 8/2013 | Anzures | |
| D701,226 S | 3/2014 | Jung | |
| D702,702 S | 4/2014 | Carter | |
| D704,220 S | 5/2014 | Lim | |
| D705,244 S | 5/2014 | Arnold | |
| D705,253 S | 5/2014 | Mairs | |
| D705,810 S | 5/2014 | Ma | |
| D706,814 S | 6/2014 | Phelan | |
| D709,911 S | 7/2014 | Ording | |
| D709,912 S | 7/2014 | Abratowski | |
| D714,811 S | 10/2014 | Kim | |
| D717,338 S | 11/2014 | Anzures | |
| D718,779 S | 12/2014 | Hang Sik | |
| D726,221 S | 4/2015 | Gomez | |
| D729,837 S | 5/2015 | Kang | |
| D734,358 S | 7/2015 | Rehberg | |
| D736,255 S | 8/2015 | Lim | |
| D738,904 S | 9/2015 | Tyler | |
| D748,131 S | 1/2016 | Kovacevic | |
| D751,090 S* | 3/2016 | Hu | D14/485 |
| D751,570 S | 3/2016 | Lee | |
| D752,100 S | 3/2016 | Anzures | |
| D759,080 S | 6/2016 | Luo | |
| D760,735 S | 7/2016 | Cheng | |
| D762,675 S | 8/2016 | Lim | |
| D763,283 S | 8/2016 | Anzures | |
| D768,666 S | 10/2016 | Anzures | |
| D770,495 S | 11/2016 | Knapp | |
| D783,652 S | 4/2017 | Guan | |
| D785,032 S | 4/2017 | Bhat | |
| D785,033 S | 4/2017 | Bhat | |
| D785,034 S | 4/2017 | Bhat | |
| D789,406 S | 6/2017 | Ive | |
| 2006/0031069 A1* | 2/2006 | Huang | G10L 13/08 704/243 |
| 2008/0007571 A1* | 1/2008 | Lee | G06F 3/0481 345/678 |
| 2009/0192786 A1* | 7/2009 | Assadollahi | G06F 3/0234 704/9 |
| 2011/0161080 A1* | 6/2011 | Ballinger | G10L 15/30 704/235 |
| 2013/0254714 A1* | 9/2013 | Shin | G06F 3/0482 715/810 |
| 2014/0109016 A1* | 4/2014 | Ouyang | G06F 17/24 715/856 |
| 2014/0125589 A1 | 5/2014 | Kim | |
| 2014/0244686 A1* | 8/2014 | Tran | G10L 15/22 707/775 |
| 2014/0257805 A1* | 9/2014 | Huang | G10L 15/063 704/232 |
| 2014/0267543 A1 | 9/2014 | Kerger | |
| 2014/0306897 A1* | 10/2014 | Cueto | G06F 3/04883 345/173 |
| 2014/0306899 A1* | 10/2014 | Hicks | G06F 3/04883 345/173 |
| 2014/0372112 A1* | 12/2014 | Xue | G10L 15/16 704/232 |
| 2014/0379341 A1 | 12/2014 | Seo | |
| 2015/0020170 A1 | 1/2015 | Talley | |
| 2015/0040012 A1* | 2/2015 | Faaborg | G06F 3/167 715/728 |
| 2015/0051898 A1* | 2/2015 | Cuthbert | G06F 3/167 704/3 |
| 2015/0160919 A1* | 6/2015 | Kim | G06F 3/017 704/275 |
| 2015/0234593 A1 | 8/2015 | St. Clair | |
| 2015/0317482 A1* | 11/2015 | Blaisdell | G06F 3/0484 726/26 |
| 2016/0064002 A1 | 3/2016 | Kim | |
| 2016/0104474 A1 | 4/2016 | Bunn | |
| 2016/0274761 A1* | 9/2016 | Alonso Ruiz | G06F 3/04886 |
| 2016/0277903 A1* | 9/2016 | Poosala | H04W 4/12 |
| 2017/0017376 A1 | 1/2017 | Han | |
| 2017/0026705 A1 | 1/2017 | Yeh | |
| 2017/0031530 A1 | 2/2017 | Ikeda | |
| 2017/0116990 A1 | 4/2017 | Faaborg | |
| 2017/0134321 A1* | 5/2017 | Ushio | G06F 13/00 |

OTHER PUBLICATIONS

Chandrashekhar, "Best Speech to Text Apps for Android," posted at Best Android Apps, posting date Jun. 9, 2015. [online], [site visited May 18, 2017]. Available from Internet, <URL: http://bestandroidapps.com/best-speech-to-text-apps-for-android/>. (4 pgs).

Grover, "Chinese Mobile App UI Trends," posted at Dan Grover Blog, posting date Dec. 1, 2014. [online], [site visited May 18, 2017]. Available from Internet, <URL: http://dangrover.com/blog/2014/12/01 /chinese-mobile-app-ui-trends.html>. (2 pgs).

Hoffman, "Type Faster: 6 Tips and Tricks for Mastering Android's Keyboard," posted at How to Geek, posting date Jun. 10, 2013. [online], [site visited May 18, 2017]. Available from Internet, <URL: https://www.howtogeek.com/165026/type-faster-6-tipsand-tricks-for-mastering-androids-keyboard/>. (2 pgs).

Newton, "Live Voice typing: Coming soon to an Android 4.0 phone near you," posted at Recombu, posting date Dec. 13, 2011 X. [online], [site visited May 18, 2017]. Available from Internet, <URL: https://recombu.com/mobile/article/live-voice-typingcoming-soon-to-an-android-40-phone-near-you_M16093.html>. (1 pg).

Koetse, "Talk to Type Chinese—Baidu Gets What You Mean," posted at Manya Koetse, posting date Aug. 16, 2013. [online], [site visited May 18, 2017]. Available from Internet, <URL: http://www.manyakoetse.com/baiduinput/>. (3 pgs).

Singh, "A trick to use Google voice typing on your PC," posted at Vintaytime, update date Apr. 30, 2016. [online], [site visited May 18, 2017]. Available from Internet, URL: http://vintaytime.com/google-voice-typing-pc/>. (2 pgs).

Dragon Mobile Assistant, posted at Google Play, update date Jul. 13, 2015. [online], [site visited May 18, 2017]. Available from Internet, <URL: https://play.google.com/store/apps/details?id=com.nuance.balerion&hl=en>. (2 pgs).

Apple Dictation, [online], [site visited Apr. 25, 2018]. Available from Internet, <URL: https://help.apple.com/iphone/7/#/iph2c0651d2>. (2 pgs).

Dragon Anywhere, [online], [site visited Apr. 25, 2018]. Available from Internet,,<URL: https://www.macworld.com/article/3070092/ios/dragon-anywhere-review-much-more-powerful-than-siri-dictation.html>. (6 pgs).

Google Voice Typing, [online], [site visited May 14, 2018]. Available from Internet,, <URL:https://www.extremetech.com/mobile/213506-google-docs-voice-typing-lets-you-speak-instead-of-type> (4 pgs).

(56) References Cited

OTHER PUBLICATIONS

Google Voice Typing, [online], [site visited May 14, 2018]. Available from Internet,, <URL:https://www.howtogeek.com/165026/type-faster-6-tips-and-tricks-for-mastering-androids-keyboard/> (4 pgs).
Baidu IME, [online], [site visited May 14, 2018]. Available from Internet, <URL: http://www.manyakoetse.com/baiduinput/> (6 pgs).

* cited by examiner

SYSTEMS AND METHODS FOR IMPROVED USER INTERFACE

CROSS-REFERENCE TO RELATED APPLICATIONS

This application claims the priority benefit under 35 USC § 119(e) to commonly assigned and U.S. Patent Application No. 62/359,157, filed on 6 Jul. 2016, entitled "SYSTEMS AND METHODS FOR IMPROVED USER INTERFACE," and listing Zhuxiaona Wei, Thuan Nguyen, Iat Chan, Kenny M. Liou, Helin Wang, and Houchang Lu as inventors. The aforementioned patent document is incorporated by reference herein in its entirety.

COPYRIGHT NOTICE

A portion of the disclosure of this patent document contains material that is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

A. Technical Field

The present invention relates generally to improving human-computer interfacing. More particularly, the present disclosure relates to systems and methods for improving user interfacing with a computing device.

B. Description of the Related Art

The prevalence and use of mobile electronic devices has dramatically increased over the last several years. For example, smartphones and tablet computers are ubiquitous and are used innumerable times daily by millions of users. Lower costs, increased computing capabilities, increased functionality, and more compact sizes are among some of the factors that have contributed to the widespread adoption and use of these mobile devices.

While the compact sizes of these mobile devices make them much more portable and convenient, the small form factor creates a challenge with respect to interfacing. Human-device interfacing is important because it directly affects the usability of the device. Regardless of the number of useful features that a mobile device might have, if it is difficult or cumbersome for the user to interface with the mobile device to access or use these features, then the user's experience can be negatively impacted. Unlike laptops and desktop computers that have large screens, keyboards, abundant power, and connections that can support a number of other interface devices, the small screen size, lack of physical keyboard on most mobile devices, and limited power severely restricts options for interfacing.

Some conventional user interfaces have tried using physical buttons. However, such approaches have their own drawbacks. For example, there can only be a limited number of buttons. Also, these buttons have limited functions, often are not configurable, and can be cumbersome to use.

Some user interfaces have tried using soft buttons or soft keys. These buttons are buttons displayed on a touch-sensitive display. Such configurations eliminate the need for providing physical space on the mobile device for physical keys. However, such approaches also have their own drawbacks. For example, there is often only space for a limited number of buttons. To remedy this issue, multiple screens of buttons may be provided. But, a user must remember or search through the various interfaces to find a desired button, and these plurality of screens are not configurable and can also be cumbersome to use.

Some mobile devices provide separate voice inputs. A primary goal of these voice interfaces is to make interfacing with a mobile device easier and more natural. While voice recognition has improved dramatically over the last several years, it still has limitations. Thus, when the voice recognition makes a transcription error or other error, it can be even more frustrating for users. This frustration comes, in part, because the various interfaces tend to be exclusively of one type—either for text input or for voice input, but not both. Therefore, there is no easy way to correct an error in the voice input.

Accordingly, what is needed are systems and methods that can provide improved user interfaces.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
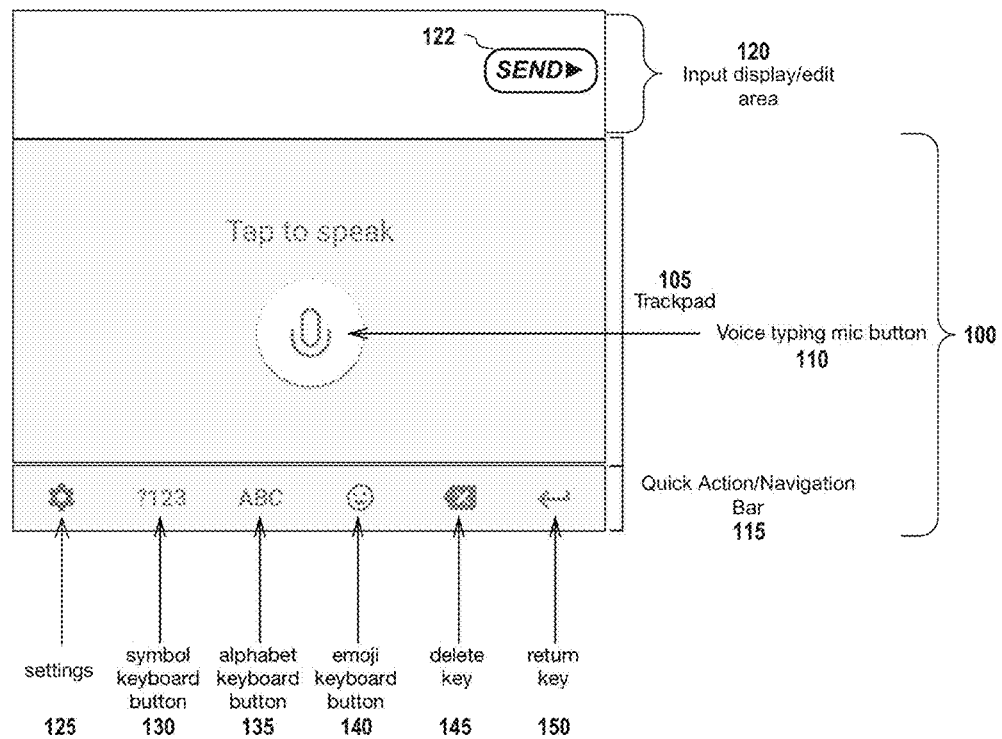
FIG. 1 depicts an example user interface for facilitating user input into a computing device according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments. Furthermore, the use of certain terms in various places in the specification is for illustration and should not be construed as limiting. Any headings used herein are for organizational purposes only and shall not be used to limit the scope of the description or the claims. Each reference mentioned in this patent document is incorporate by reference herein in its entirety.

Use of the term "mobile device," "computer," "computing device," "computing system," "information handling system," and the like shall be understood to mean any computing device with or communicatively coupled to a touch-sensitive display. Use of the term "button" in the context of a graphical user interface shall be understood to include soft or virtual buttons, icons, text, graphics, or any other indicator that may be selected by a user to invoke a function or feature.

It shall also be noted that: (1) certain steps may optionally be performed; (2) steps may not be limited to the specific order set forth herein; (3) certain steps may be performed in different orders; and (4) certain steps may be done concurrently.

A. Introduction

Aspects of the present disclosure relate to systems and methods for a voice-centric virtual or soft keyboard (or keypad). Currently, no keyboards focus on voice typing— either there is no voice typing, or using voice typing as a complimentary. As breakthroughs and improvements in voice/speech recognition are continually made, such as higher accuracy and lower word error rates (WER), voice will increasingly become a more natural, efficient, and convenient means by which to interface with a computing device.

Embodiments of the interface disclosed herein may also include a "Quick Action Bar," which provides quicker and easier access to other keyboards and important functions/ actions, enabling a voice-centric, seamless, and powerful input experience. Unlike other keyboards, embodiments of the present disclosure prioritizes the voice keyboard, meanwhile providing users with a quick and uniform navigation to other keyboards (e.g., alphabet, punctuations, symbols, emoji's, etc.). In addition, common actions, such as delete and return are easily accessible. In embodiments, the keyboard is also configurable to allow a user to organize buttons according to their desired use and layout. In embodiments, the customization and contextual-based features of the Quick Action Bar provides a user more personalization freedoms, improving user's productivity and enjoyment.

Embodiments of the interface disclosed herein also provide easier and quicker navigation and selection then other keyboards on the market. Its intuitive gestures allow users to quickly move the text cursor while editing, much faster than manually selecting the text in the text view.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this introductory section.

B. Embodiments of the Graphical User Interface

FIG. 1 depicts an example user interface for facilitating user input into a computing device according to embodiments of the present disclosure. In embodiments, the interface comprises a trackpad portion 105, a voice typing microphone button 110, and a quick action/navigation portion 115.

In embodiments, the trackpad portion 105 comprises a virtual touch space or trackpad that captures user inputs. For example, in embodiments, this touchpad portion captures touch inputs, such as single or multiple touch inputs, from the user and also converts the user's finger movement to cursor movement.

In embodiments, the voice typing microphone button 110 provides a convenient interface that allows the user to activate the voice input functions. In embodiments, the interface 100 may comprise text or other graphics that indicate when the voice input is active. For example, as depicted in FIG. 1, the trackpad portion displays the text "Tap to speak" near the voice typing microphone button 110, indicating to a user that the voice input is not active and may be activated by touching the button 110. In embodiments, once selected by a user and the voice input is activated, the interface may change to indicate such. In embodiments, the interface may also have a modulation indicator that is correlated to the speech of the user.

Figure 2:
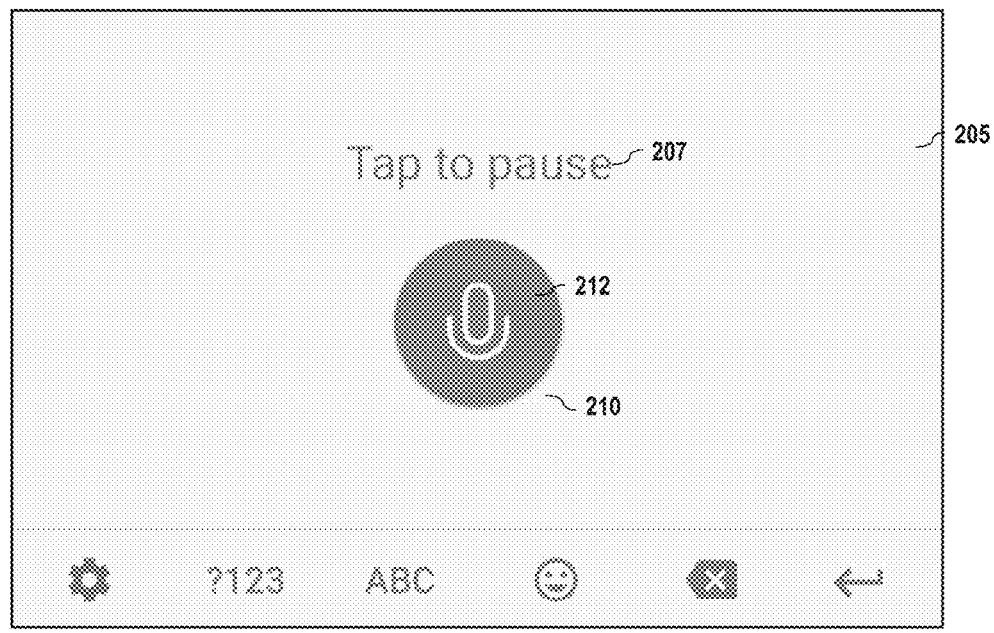
FIG. 2 depicts an example user interface for facilitating user input into a computing device, which indicates that the voice input is active, according to embodiments of the present disclosure.

FIG. 2 depicts an example user interface for facilitating user input into a computing device, which indicates that the voice input is active, according to embodiments of the present disclosure. As illustrated in the embodiment depicted in FIG. 2, the display within the trackpad area 205 may change to "Tap to pause" 207 to indicate that the computing device is current listening for voice input via a microphone communicatively coupled to the computing device and that the voice-input functionality may be stopped or paused by touching the microphone button 210. In embodiments, one or more different or additional indicators may be used. For example, as illustrated in the embodiment shown in FIG. 2, the voice typing microphone button 210 may change color 212 or be otherwise altered to differentiate it from the non-voice-inputting state.

Returning to FIG. 1, in embodiments, the interface 100 also comprises a navigation portion or quick action bar 115. In embodiments, the navigation portion 115 comprises access to one or more other features or interface screens. For example, in the embodiment depicted in FIG. 1, there are a number of buttons or links to different screens, such as settings 125, a symbol keyboard button 130, an alphabet keyboard button 135, and an emoji keyboard button 140. It shall be noted that the navigation interface portion 115 may have more or fewer buttons to other screens and that there may be buttons to different screens and the order/placement of those buttons also can be customized.

It shall be noted that the quick action bar 115 may display other buttons. For example, the quick action bar 115 also includes buttons for frequently used items, such as a delete key 145 and a return/enter key 150. In embodiments, different or additional buttons may be displayed. In embodiments, the quick action bar portion 115 may move relative to the trackpad 105 to access more buttons. It shall be noted that while embodiments depicted herein show the navigation portion 115 at the bottom of the interface 100, the navigation portion 115 may be in a different location, may be oriented differently, may comprise multiple lines, may be in one or more portions, may comprise different buttons—all of the foregoing features may be configurable by a user.

FIG. 1 also includes, by way of providing context, an input display area 120, which displays the text and/or graphics input by a user via any of the interfaces 100 (e.g., voice input, alphabet keyboard, emoji's keyboard, cut and paste items, etc.), and may include a button or icon 122 for the user to submit or send the inputted data (e.g., text and/or graphics). In embodiments, the submit or send button 122 is derived or depends upon the parent application using the interface 100 and may not be considered part of the interface 100. It shall be noted that, in embodiments, the input display/edit area 120 is not part of the interface 100. It shall be noted that embodiments of the interface 100 may be used or may be adapted for use with any of a plurality of applications, including search, texting, emailing, social media, notes taking, document editing, and applications that involves text input.

Figure 3:
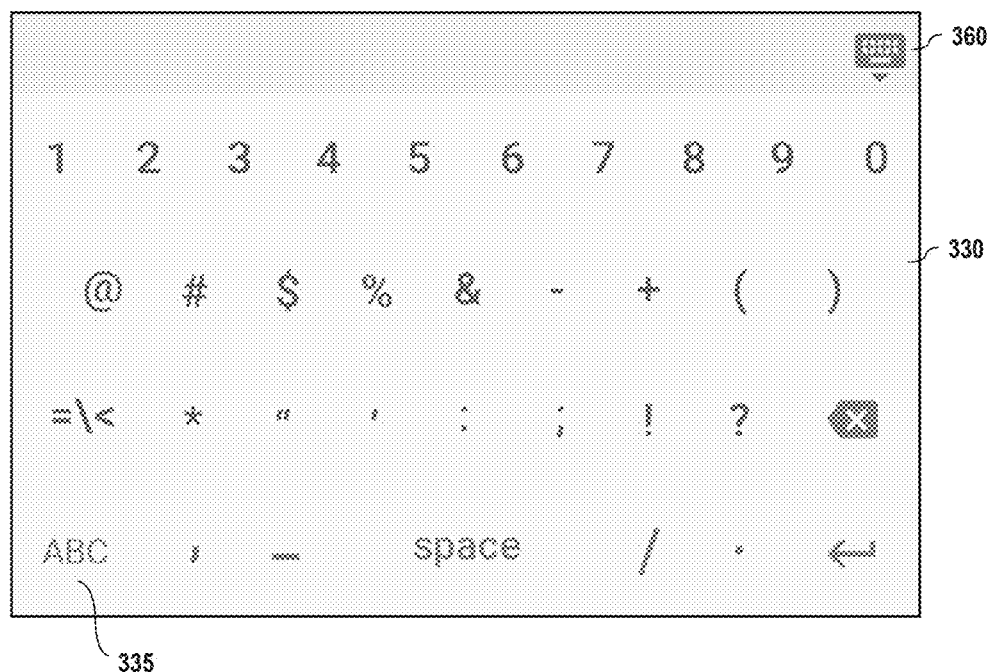
FIG. 3 depicts an example symbol keyboard embodiment of an interface according to embodiments of the present disclosure.

FIG. 3 depicts an example symbol keyboard embodiment of an interface according to embodiments of the present disclosure. As shown in FIG. 3, the interface 300 comprises a symbol keyboard 330. In embodiments, the interface 300 may also comprise additional buttons, such as a button to different keyboard, such as the alphabet keyboard 335. In embodiments, the interface may also include a button 360 that causes the current keyboard, in this case the symbol keyboard 330, to return to a typical or "home" interface view. In embodiments, the "home" screen may be a voice-input-centric interface, such as the one 100 depicted in FIG. 1.

In embodiments, each of these various features (such as how many and which other screen buttons should be displayed, which view should be the "home" view, whether selection of the button 360 causes the interface to return to a home screen or to the immediately prior screen, which buttons appear on the symbol screen, the ordering the buttons on the interface 300, and the like) may be configurable. In embodiments, these options may be accessed and set by a user. In embodiments, the options may be accessed via in the settings button 125.

Figure 4:
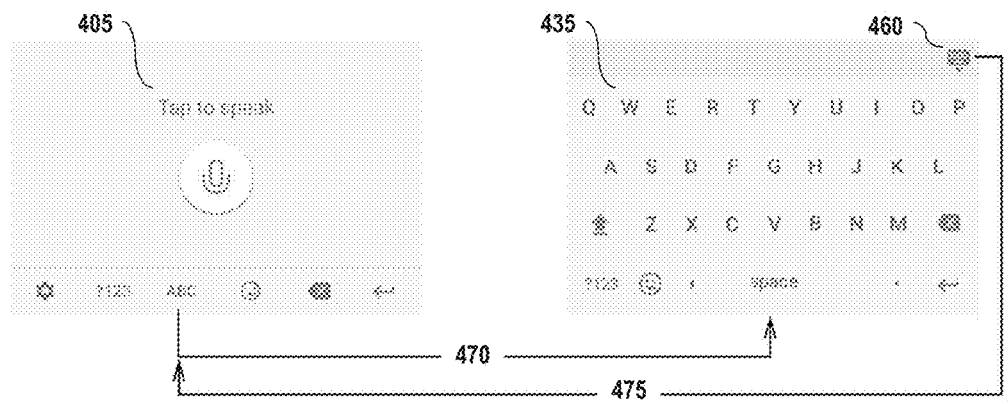
FIG. 4 illustrations switching between user interface views according to embodiments of the present disclosure.

FIG. 4 illustrations switching between user interface views according to embodiments of the present disclosure. Shown in FIG. 4 is a voice keyboard interface view 405 and an alphabet keyboard interface view 435. When a user taps the "ABC" button on the voice keyboard interface view 405, the alphabet keyboard display 435 appears (470). For example, the alphabet keyboard display view 435 may appear to slide in view from the bottom of the screen. Likewise, when the user taps the "Hide Keyboard" button 460, the alphabet keyboard interface view 435 disappears (e.g., appears to slide downward, out of view), revealing (475) the voice keyboard interface view 405.

Figure 5:
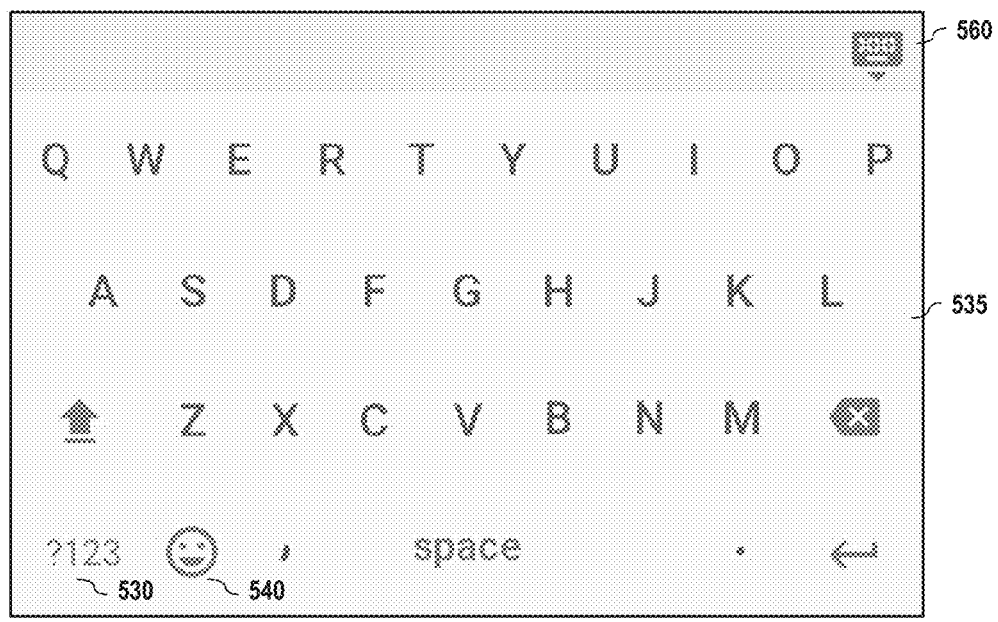
FIG. 5 depicts an example alphabet keyboard embodiment of an interface according to embodiments of the present disclosure.

FIG. 5 depicts an example alphabet keyboard embodiment of an interface according to embodiments of the present disclosure. As shown in FIG. 5, the interface 500 comprises an alphabet keyboard 535. In embodiments, the interface 500 may also comprise additional buttons, such as a button to different keyboard, such as the symbols keyboard 530 and the emoji's keyboard 540. As discussed with respect to FIGS. 3 and 4, in embodiments, the interface 500 may also include a button 560 that causes the interface view to hide the keyboard (e.g., by returning to the voice interface view 100).

Figure 6:
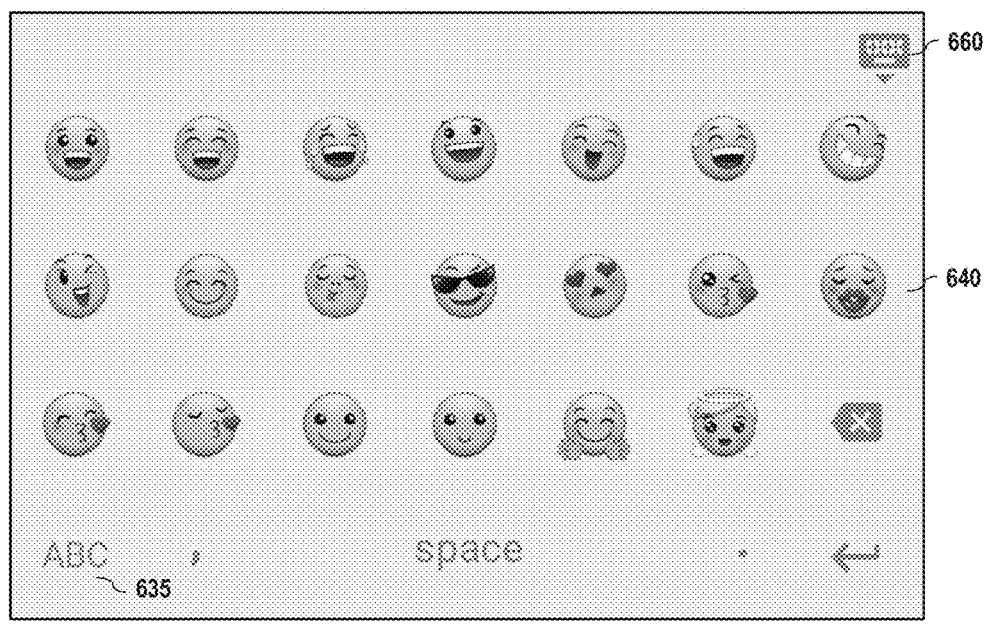
FIG. 6 depicts an example emoji keyboard button embodiment of an interface according to embodiments of the present disclosure.

FIG. 6 depicts an example emoji's keyboard button embodiment of an interface according to embodiments of the present disclosure. As shown in FIG. 6, the interface 600 comprises an emoji's keyboard 640. In embodiments, the interface 600 may also comprise one or more buttons to different keyboards (e.g., the alphabet keyboard 635). As discussed with respect to FIGS. 3, 4, and 5, in embodiments, the interface 600 may also include a button 660 that causes interface to return to a typical or "home" interface view, such as voice input interface 100.

In embodiments, the data that appears in a display area remains while a user switches between the various views or keyboards.

Figure 7:
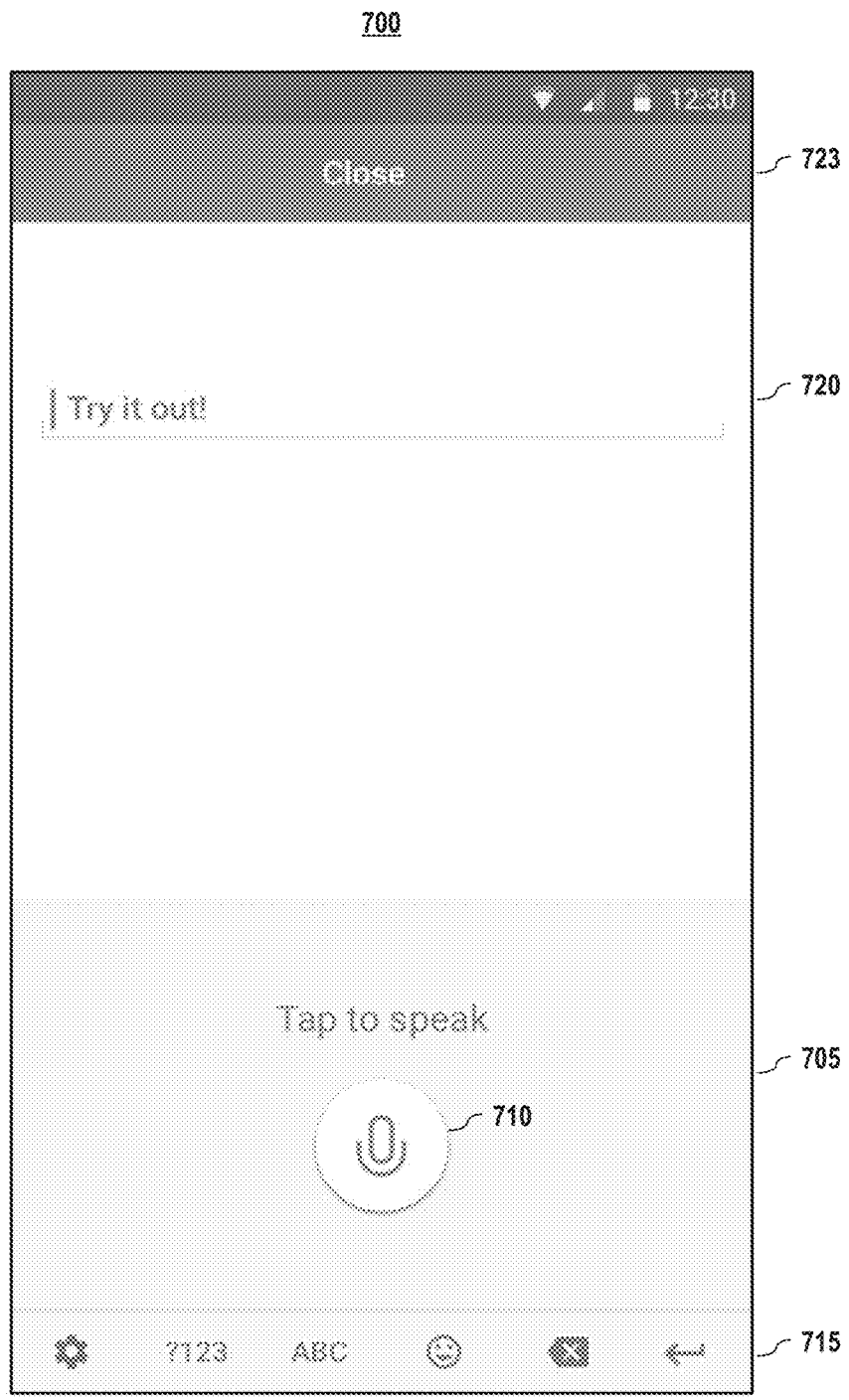
FIG. 7 depicts an alternative embodiment of a user interface for facilitating user input into a computing device according to embodiments of the present disclosure.

FIG. 7 depicts an alternative embodiment of a user interface for facilitating user input into a computing device according to embodiments of the present disclosure. In embodiments, the interface 700 comprises a trackpad portion 705, a voice typing microphone button 710, and a quick action bar 715. In embodiments, the interface may also include a close button 723 for terminating application of the user interface 700. Also shown in FIG. 7 is a display area 720.

In embodiments, the interface may be sized to different sizes to consume more or less of the computing device's display. In embodiments, the interface may receive, display, and allow editing of text and graphics (including multimedia elements, such as .gif files, sound clips, graphics, icons, photos, etc.).

C. Embodiments of Touch Inputs

Embodiments of the interface may recognize a plurality of inputs from the user, which may be correlated to one or more actions. Presented below are some example inputs and corresponding actions. However, one skilled in the art shall recognize a number of different input variations (e.g., number of fingers uses, tap vs. hold, tap pattern, hold pattern, swiping, swipe patterns, etc.) may be used and fall within the scope of the current disclosure. It shall also be noted that, in embodiments, an input and its corresponding action may both be defined by the user. For example, a user may define a three-finger swipe to select all data in the input display/edit area.

1. Example Embodiments of Single-Finger Swipe

In embodiments, a user may place one finger on the trackpad area and move his or her finger to navigate and select text, graphics, etc. In embodiments, this navigation feature applies to the voice keyboard interface, such as that shown in FIG. 1.

Figure 8:
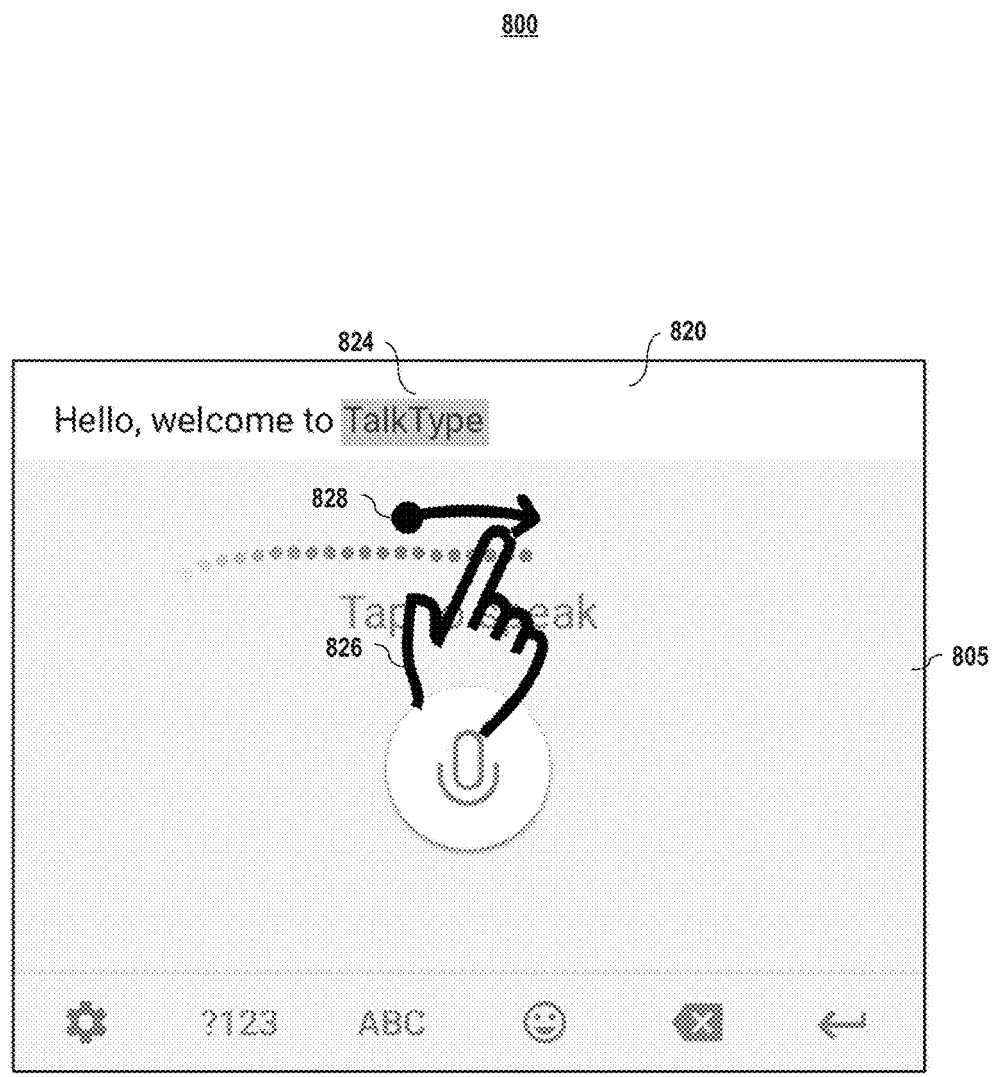
FIG. 8 graphically depicts an example single-finger swipe for an embodiment of the interface according to embodiments of the present disclosure.

FIG. 8 graphically depicts an example single-finger swipe for an embodiment of the interface according to embodiments of the present disclosure. As depicted in FIG. 8, in embodiments, when applied to text view, a single-finger swipe on the touch screen in the trackpad 805 portion of the interface allows a user to move the text cursor up, down, left, right, or diagonal in the text view corresponding to the direction of the swipe. In embodiments, a cursor in the edit text field will move one word at a time, highlighting the selected word along the way. In embodiments, as the cursor moves from word to word, the previous word is no longer highlighted/selected and the new word is highlighted/selected; that is, a single-finger swipe only highlights/selects the word at which the cursor currently is as it moves word by word. In the example shown in FIG. 8, as the user's finger 826 moves on the trackpad 805, a cursor in the edit text field 820 will move one word at a time (to the right 828 in this depicted example), highlighting only the selected word along the way. In the depicted example, the current word that the cursor has moved to using the single-finger swipe is "TalkType", which is why it is highlighted/selected and why the prior word "to" is no longer highlighted/selected.

In embodiments, once the user's finger is lifted from the touch screen, the interface 800 will not highlight any additional items. Also, in embodiments, to cancel the selection of the item that has been highlighted, a user can tap on the trackpad 805. Alternatively, or additionally, in embodiments, to cancel the selection of the item that has been highlighted, a user can perform a single-finger swipe—when there is a current selection and a user performs another single-finger swipe, the previous selection is canceled and a new selection will be performed.

2. Embodiments of Two-Finger Swipe

Figure 9:
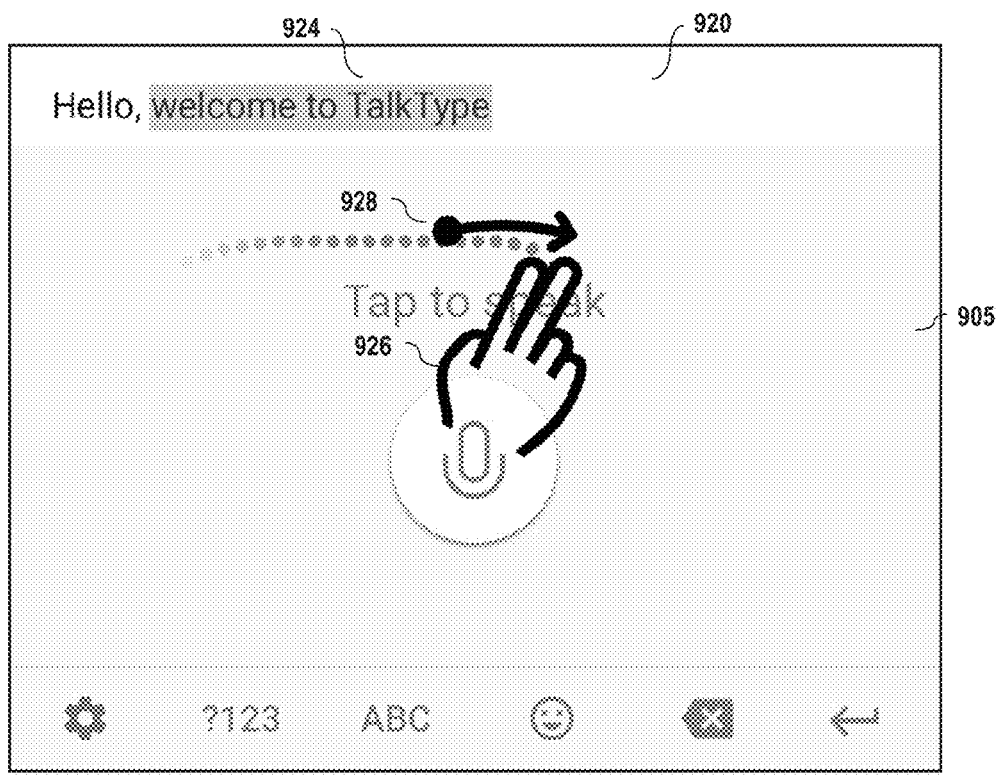
FIG. 9 graphically depicts an example two-finger swipe for an embodiment of the interface according to embodiments of the present disclosure.

FIG. 9 graphically depicts an example two-finger swipe for an embodiment of the interface according to embodiments of the present disclosure. As depicted in FIG. 9, in embodiments, a user places two fingers on the trackpad 905 and moves (928) both fingers to select an item or items in the display portion 920.

In embodiments, when applied to a text view (as shown in FIG. 9), as the fingers 926 move on the trackpad 905, text is selected from the initial text cursor position before the user touched the trackpad 905 to a final cursor position after the user has swiped in a direction (e.g., up/down/left/right/diagonal). In the depicted embodiment, the user has swiped right, and thus, the highlighting (selection process) correspondingly moved right. As depicted in FIG. 9, in embodiments, when applied to text view, a two-finger swipe on the touch screen in the trackpad 905 portion of the interface allows a user to move the text cursor up, down, left, right, or diagonal in the text view, selecting all text from the initial cursor position to the final cursor position. Thus, in embodiments, a two-finger swipe may also move the cursor and select one word at a time, but it continues the highlighting/selecting across all the text across which the cursor has traveled. By way of illustration, as shown in FIG. 9, the two-finger swipe started with "welcome" and continued to "TalkType" highlighting all the words between those two words and also including those words.

In embodiments, a two-finger swipe also supports continual selection. In embodiments, when applied to a text view, once a user has selected text using a two-finger swipe, when they lift their fingers and then perform another two-finger swipe, the previous text selection is preserved, and new text will be added or removed from the selection based on the user's two-finger movement. In embodiments, this process may be similarly applied to a single-finger swipe followed by the user lifting his or her finger and performing a two-finger swipe—the previous text selection is preserved and new text will be added or removed from the selection based on the user's two-finger movement.

In embodiments, once the user's finger is lifted from the touch screen, the interface 900 will not highlight any additional items. Also, in embodiments, to cancel the selection of the item that has been highlighted, a user can tap on the trackpad 905. Alternatively, or additionally, in embodiments, to cancel the selection of the item that has been highlighted, a user can perform a single-finger swipe—when there is a current selection and a user performs another single-finger swipe, the previous selection is canceled and a new selection will be performed.

D. Exemplary Computing System Embodiments

Aspects of the present patent document are directed to user interfacing with a computing system. For purposes of this disclosure, a computing system may include any instrumentality or aggregate of instrumentalities operable to compute, calculate, determine, classify, process, transmit, receive, retrieve, originate, route, store, display, communicate, manifest, detect, record, reproduce, handle, or utilize any form of information, intelligence, or data for business, scientific, control, or other purposes. For example, a computing may be a personal computer (e.g., desktop or laptop), tablet computer, mobile device (e.g., personal digital assistant (PDA) or smart phone), server (e.g., blade server or rack server), a network device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more storage elements, one or more network ports for communicating with external devices as well as various input and output (I/O) devices, such as a touchscreen. The computing system may also include one or more buses operable to transmit communications between the various hardware components.

Figure 10:
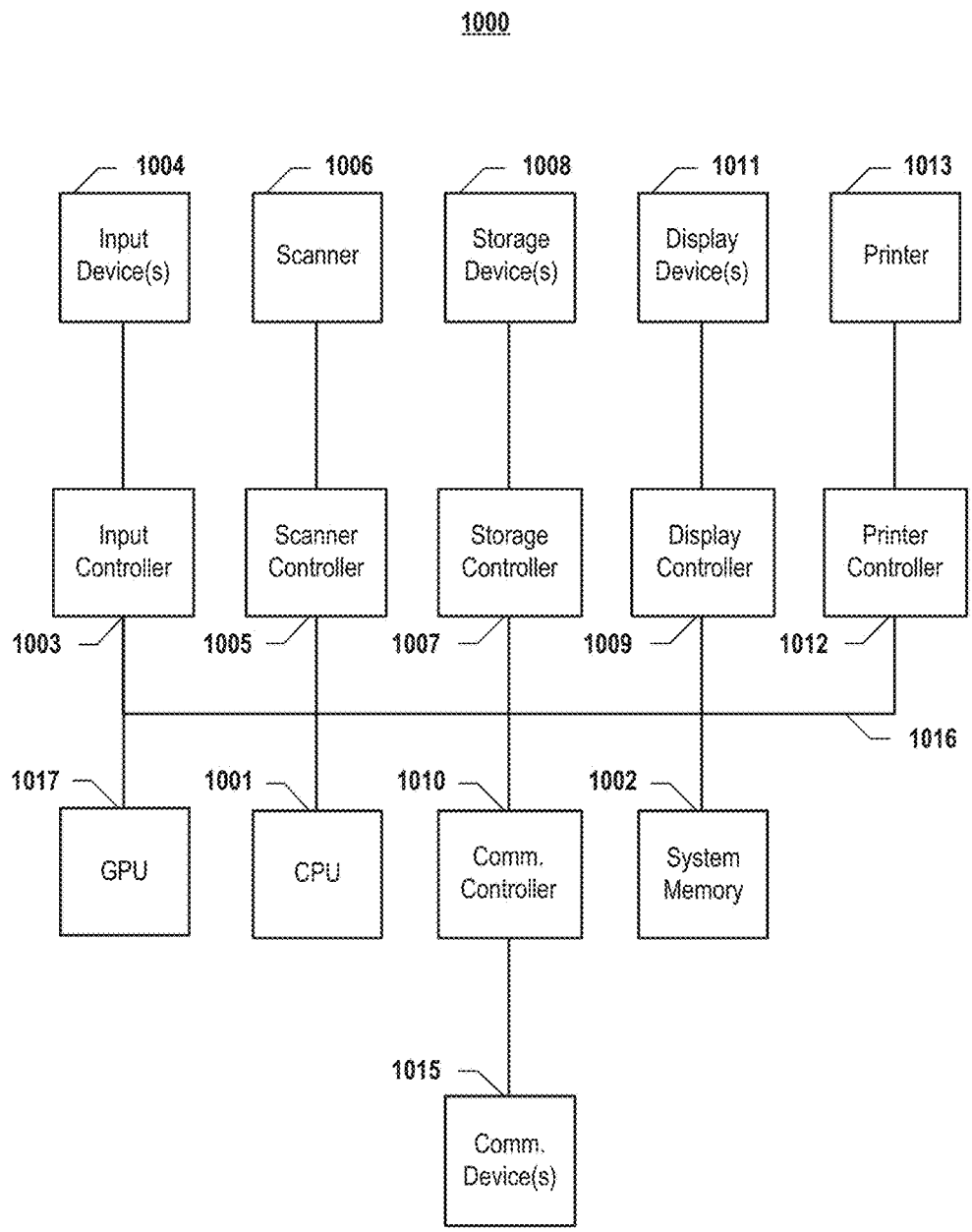
FIG. 10 depicts a simplified block diagram of a computing device according to embodiments of the present invention.

FIG. 10 depicts a block diagram of a computing system 1000 according to embodiments of the present invention. It will be understood that the functionalities shown for system 1000 may operate to support various embodiments of a computing system—although it shall be understood that a computing system may be differently configured and include different components. As illustrated in FIG. 10, system 1000 includes one or more central processing units (CPU) 1001 that provides computing resources and controls the computer. CPU 1001 may be implemented with a microprocessor or the like, and may also include one or more graphics processing units (GPU) 1017 and/or a floating point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a touchscreen, keyboard, mouse, microphone, or stylus. There may also be a scanner controller 1005, which communicates with a scanner 1006. System 1000 may also include a storage controller 1007 for interfacing with one or more storage devices 1008 each of which includes a storage medium such as magnetic disk or solid state drive, or an optical medium that might be used to record programs of instructions for operating systems, utilities, and applications, which may include embodiments of programs that implement various aspects of the present invention. Storage device(s) 1008 may also be used to store processed data or data to be processed in accordance with the invention. System 1000 may also include a display controller 1009 for providing an interface to a display device 1011, which may be a touch-sensitive display. The computing system 1000 may also include a printer controller 1012 for communicating with a printer 1013. A communications controller 1010 may interface with one or more communication devices 1015, which enables system 1000 to connect to remote devices through any of a variety of networks including the Internet, an Ethernet cloud, a Fiber over Ethernet/Data Bridging Center cloud, a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (Plods), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; solid state memory devices; and hardware devices that are specially configured to store or to store and execute program code, such as application specific integrated circuits (ASICs), programmable logic devices (Plods), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

Figure 11:
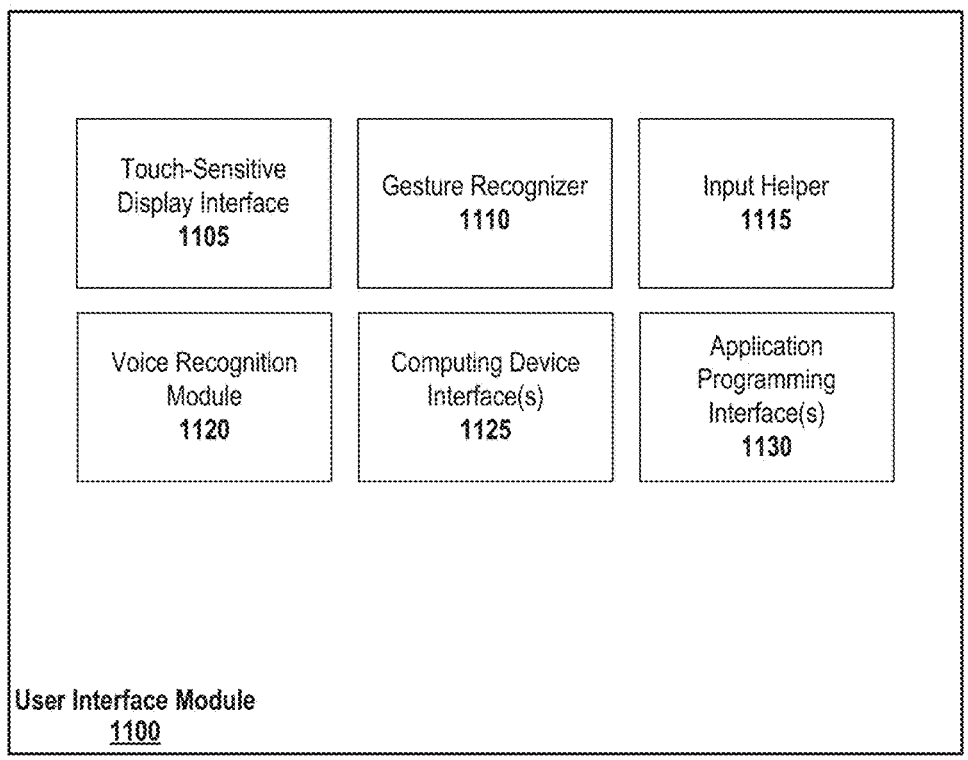
FIG. 11 depicts a user interface module according to embodiments of the present disclosure.

FIG. 11 depicts a user interface module according to embodiments of the present disclosure. The user interface module 1100 may be non-transitory software, hardware, or combination thereof. In embodiments, the module 1100 may comprise a touch-sensitive display interface 1105 for interfacing with a touch-sensitive display to display items on the display and to receive inputs from the display. In embodiments, the module 1100 comprises a gesture recognizer 1110 that receives user inputs from the touch-sensitive display via the interface 1105 and recognizes the user inputs as corresponding to specific gestures.

In embodiments, the module 1100 may comprise an input helper 1115 that, responsive to a gesture being recognized, performs or assists in performing one or more actions related to the recognized gesture. For example, in embodiments, the gesture recognizer 1110 identify inputs from the display as being a single-finger swipe causes the input helper 1115 to manipulate the cursor on the display accordingly.

Figure 12:
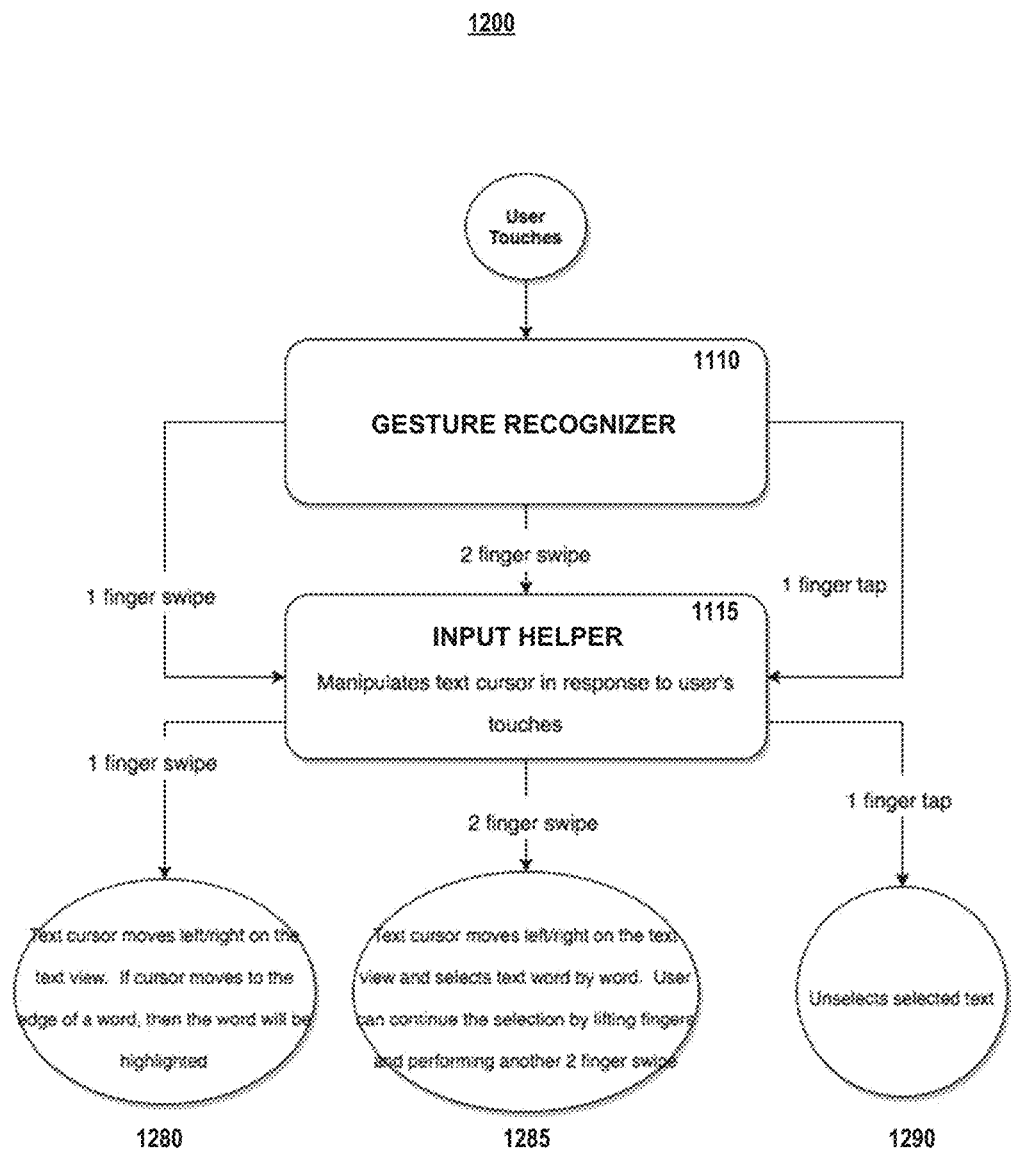
FIG. 12 depicts some examples of interactions between a gesture recognizer and an input helper of a user interface module according to embodiments of the present disclosure.

FIG. 12 depicts some examples of interactions between the gesture recognizer 1110 and the input helper 1115 according to embodiments of the present disclosure. As shown in FIG. 12, the gesture recognizer 1110 received inputs from a touch display and recognizes the type (e.g., single finger, two finger, taps, etc.). Depending upon the type of recognized gesture, in embodiments, the input helper 1115 manipulates the cursor on the display in response to the user's touch. Depending upon which action is correlated to the gesture, the input helper 1115 affects the display accordingly. FIG. 12 depicts three different actions 1280, 1285, and 1290, each being correlated to a specific gesture, one-finger swipe, two-finger swipe, and one-finger tap, respectively.

Returning to FIG. 11, in embodiments, the module 1100 may comprise a voice recognition module 1120 that receives audio when a user selects voice input via the graphical user interface and converts the audio into text. In embodiments, the voice recognition module 1120 may also recognize commands that are executed rather than simply converting all the input audio into text. In embodiments, the voice recognition module may comprise a trained transcription model that receives audio or spectrograms of audio and using the trained neural network to convert the audio into predicted character probabilities, which may then be constrained by a language model to output the final transcription.

A transcription model, such as one disclosed in U.S. patent application Ser. No. 15/358,102, filed on 21 Nov. 2016, entitled "END-TO-END SPEECH RECOGNITION," and listing Bryan Catanzaro, Jingdong Chen, Michael Chrzanowski, Erich Elsen, Jesse Engel, Christopher Fougner, Xu Han, Awni Hannun, Ryan Prenger, Sanjeev Satheesh, Shubhabrata Sengupta, Dani Yogatama, Chong Wang, Jun Zhan, Zhenyao Zhu, and Dario Amodei as inventors, may be used. The aforementioned patent document is incorporated by reference herein in its entirety.

Figure 13:
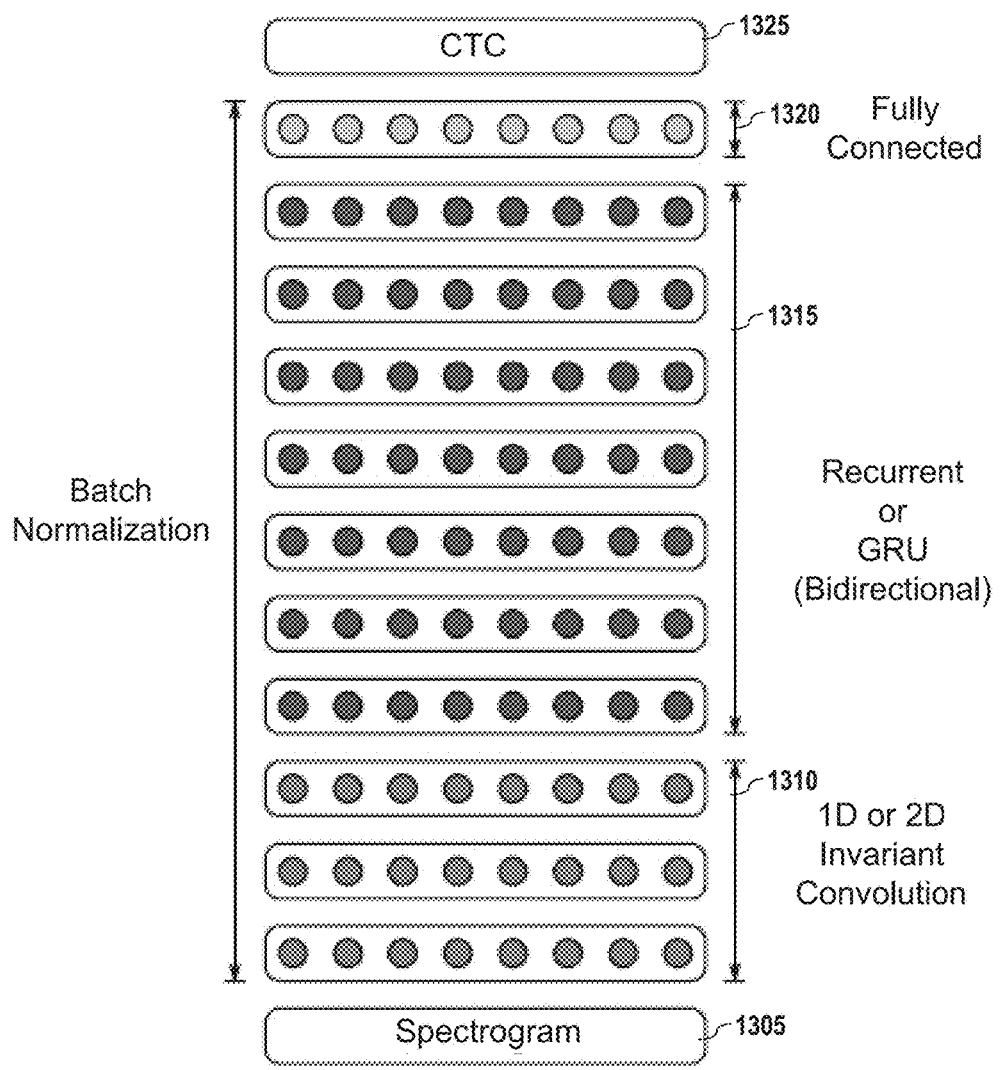
FIG. 13 depicts an architecture for an end-to-end deep learning model according to embodiments of the present disclosure.

FIG. 13 shows an exemplary architecture for an end-to-end deep learning system according to embodiments of the present disclosure. In the depicted embodiment, the architecture 1300 comprises a recurrent neural network (RNN) model trained to ingest speech spectrograms 1305 and generate text transcriptions. In embodiments, the model 1300 comprises several layers including one or more convolutional layers 1310, followed by one or more recurrent layers (which may be gated recurrent unit (GRU) layers) 1315, followed by one or more fully connected layers 1320. The convolutional layers may be invariance convolution layers. For example, convolution layers may both in the time and frequency domain (2D invariance) and in the time (or frequency) only domain (1D invariance).

In embodiments, the architecture of the system depicted in FIG. 13, which may be referred to generally as Deep Speech 2 or DS2, was used to train on both English and Mandarin speech. In embodiments, variants of this architecture may be used. For example, in embodiments, the number of convolutional layers was varied from 1 to 3 and the number of recurrent or GRU layers was varied from 1 to 7.

In embodiments, the RNN model may be trained using one or more Connectionist Temporal Classification (CTC) layers 1325. The CTC layer may include a softmax layer. In embodiments, Batch Normalization (BatchNorm) is used for one or more minibatches of utterances in the convolutional layer(s) 1310, the recurrent layers 1315, and/or the fully connected layer(s) 1320 to accelerate training for such networks since they often suffer from optimization issues. A minibatch is a collection of utterances that may be grouped together according to one or more criteria and are processed together as a group or batch. In embodiments, the input audio may be normalized to make the total power consistent among the one or more minibatches to accelerate training the model or set of models. The details of Batch Normalization are described in section D.1.

In embodiments, a method for training an RNN model according to embodiments of the present disclosure may be as follows. Let a single utterance $x^{(i)}$ and a paired ground truth label $y^{(i)}$ be sampled from a training set $X=\{(x^{(1)}, y^{(1)}), (x^{(2)}, y^{(2)}), \ldots\}$. Each utterance, $x^{(i)}$, is a time-series of length $T^{(i)}$ where every time-slice is a vector of audio features, $x^{(i)}_t$, $t=0, \ldots, T^{(i)}-1$. A spectrogram of power normalized audio clips is used as the features to the system, so $x^{(i)}_{t,p}$ denotes the power of the p'th frequency bin in the audio frame at time t. A goal of the RNN is to convert an input sequence $x^{(i)}$ into a final transcription $y^{(i)}$. For notational convenience, the superscripts are dropped and x is used to denote a chosen utterance and y the corresponding label.

In embodiments, the utterance, x, comprising a time-series of spectrogram frames, $x_{(t)}$, is inputted into a recurrent neural network (RNN) model, wherein the utterance, x, and an associated label, y, are sampled from a training set.

The RNN model outputs of graphemes of each language. In embodiments, at each output time-step t, the RNN makes a prediction over characters, $p(l_t|x)$, where $l_t$ is either a character in the alphabet or the blank symbol. In English, $l_t \in \{a, b, c, \ldots, z, \text{space}, \text{apostrophe}, \text{blank}\}$, where the apostrophe as well as a space symbol have been added to denote word boundaries.

The hidden representation at layer l is given by $h^l$ with the convention that $h^0$ represents the input x. In embodiments, the bottom of the network is one or more convolutions over the time dimension of the input. In embodiments, for a context window of size c, the i-th activation at time-step t of the convolutional layer is given by:

$$h_{t,i}^l = f(\omega_i^l \circ h_{t-c:t+c}^{l-1}) \tag{1}$$

where $\circ$ denotes the element-wise product between the i-th filter and the context window of the previous layers activations, and $f$ denotes a unary nonlinear function. In embodiments, a clipped rectified-linear (ReLU) function $\sigma(x)=\min\{\max\{x, 0\}, 20\}$ is used as the nonlinearity. In embodiments, in some layers, usually the first, are sub-sampled by striding the convolution by s frames. The goal is to shorten the number of time-steps for the recurrent layers above.

In embodiments, following the convolutional layers (1310) are one or more bidirectional recurrent layers (1315), which may be directional recurrent layers or gated recurrent units (GTUs). The forward in time $\vec{h}^l$ and backward in time $\overleftarrow{h}^l$ recurrent layer activations are computed as:

$$\vec{h}_t^l = g(h_t^{l-1}, \vec{h}_{t-1}^l)$$
$$\overleftarrow{h}_t^l = g(h_t^{l-1}, \overleftarrow{h}_{t+1}^l) \tag{2}$$

The two sets of activations are summed to form the output activations for the layer $h^l = \vec{h}^l + \overleftarrow{h}^l$. In embodiments, the function $g(\cdot)$ can be the standard recurrent operation:

$$\vec{h}_t^l = f(W^l h_t^{l-1} + U^l \vec{h}_{t-1}^l + b^l) \tag{3}$$

where $W^l$ is the input-hidden weight matrix, $U^l$ is the recurrent weight matrix, $b^l$ is a bias term, and $W^l h_t^{l-1}$ represents pre-activations. In embodiments, the input-hidden weights are shared for both directions of the recurrence. In embodiments, the function $g(\cdot)$ can also represent more complex recurrence operations, such as Long Short-Term Memory (LSTM) units and gated recurrent units (GRUs).

In embodiments, after the bidirectional recurrent layers, one or more fully connected layers (1320) are applied with:

$$h_t^l = f(W^l h_t^{l-1} + b^l) \tag{4}$$

In embodiments, the output layer L is a softmax layer computing a probability distribution over characters given by:

$$p(l_t = k | x) = \frac{\exp(w_k^L \cdot h_t^{L-1})}{\sum_j \exp(w_j^L \cdot h_t^{L-1})} \tag{5}$$

where k represents one character in the alphabet (which includes the blank symbol).

In embodiments, the model is trained using a CTC loss function (1325). Given an input-output pair (x, y) and the current parameters of the network θ, the loss function $\mathcal{L}(x,$ y; θ) and its derivative with respect to the parameters of the network $\nabla_\theta \mathcal{L}(x, y; \theta)$ are computed (220). This derivative may then be used to update the network parameters through the backpropagation through time algorithm.

In the following subsections, certain architectural and algorithmic improvements are described. Unless otherwise stated these improvements are language agnostic. Results are reported on an English speaker held out development set, which is a dataset containing 2048 utterances of primarily read speech. Embodiments of models are trained on datasets described in Section 5. Word Error Rate (WER) for the English system and Character Error Rate (CER) for the Mandarin system are reported. In both cases a language model is integrated in a beam search decoding step as described in Section D.7.

D.1 Batch Normalization for Deep RNNs

To efficiently scale embodiments of the model as the training set is scaled, the depth of the networks is increased by adding more hidden layers, rather than making each layer larger. Previous work has examined doing so by increasing the number of consecutive bidirectional recurrent layers. In embodiments, Batch Normalization (which may be referred to generally as BatchNorm) was explored as a technique to accelerate training for such networks since they often suffer from optimization issues.

Recent research has shown that BatchNorm improves the speed of convergence of recurrent nets, without showing any improvement in generalization performance. In contrast, it is demonstrated in embodiments of the models herein that when applied to very deep networks of simple RNNs on large data sets, batch normalization substantially improves final generalization error while greatly accelerating training.

In embodiments, in a typical feed-forward layer containing an affine transformation followed by a non-linearity $f(\cdot)$, a BatchNorm transformation is inserted by applying $f(B(Wh))$ instead of $f(Wh+b)$, where $$B(x) = \gamma \frac{x - E[x]}{(\text{Var}[x] + \epsilon)^{1/2}} + \beta. \tag{6}$$

x represents pre-activation, and the terms E and Var are the empirical mean and variance over a minibatch. The bias b of the layer is dropped since its effect is cancelled by mean removal. The learnable parameters γ and β allow the layer to scale and shift each hidden unit as desired. The constant $\epsilon$ is small and positive, and is included for numerical stability.

In embodiments, in the convolutional layers, the mean and variance are estimated over all the temporal output units for a given convolutional filter on a minibatch. The Batch-Norm transformation reduces internal covariate shift by insulating a given layer from potentially uninteresting changes in the mean and variance of the layer's input.

Two methods of extending BatchNorm to bidirectional RNNs have been explored. In a first method, a BatchNorm transformation is inserted immediately before every non-linearity. Equation 3 then becomes $$\vec{h}_t^l = f(B(W^l h_t^{l-1} + \vec{U}^l \vec{h}_{t-1}^l)) \tag{7}$$

In this case, the mean and variance statistics are accumulated over a single time-step of a minibatch. The sequential dependence between time-steps prevents averaging over all time-steps. It is found that in embodiments this technique does not lead to improvements in optimization.

In a second method, an average over successive time-steps is accumulated, so later time-steps are normalized over all present and previous time-steps. This also proved ineffective and greatly complicated backpropagation.

A method of sequence-wise batch normalization, which overcomes these issues of the above-explored methods, according to embodiments of the present invention, is presented below. In embodiments, the recurrent computation is given by:

$$\vec{h}_t^l = f(B(W^l h_t^{l-1}) + \vec{U}^l \vec{h}_{t-1}^l) \tag{8}$$

For each hidden unit (which may be applied to both convolution layers and recurrent layers), the mean and variance statistics of the pre-activations in the minibatch over the length of an utterance sequence are computed. In embodiments, the batch normalization comprises normalizing pre-activations at each layer of the set of layers to be batch normalized in the RNN.

Embodiments of the BatchNorm approach works well in training, but may be more difficult to implement for a deployed ASR (automatic speech recognition) system, since it is often necessary to evaluate a single utterance in deployment rather than a batch. Normalizing each neuron to its mean and variance over just the sequence may degrade performance. Thus, in embodiments, a running average of the mean and variance for the neuron collected during training are stored and may be used for evaluation in deployment. Using this technique, a single utterance can be evaluated at a time with better results than evaluating with a large batch.

D.2 SortaGrad

Training on examples of varying length poses some algorithmic challenges. One possible solution is truncating backpropagation through time, so that all examples have the same sequence length during training. However, this can inhibit the ability to learn longer term dependencies. One approach found that presenting examples in order of difficulty can accelerate online learning. A common theme in many sequence learning problems, including machine translation and speech recognition, is that longer examples tend to be more challenging.

The CTC cost function used implicitly depends on the length of the utterance, $$\mathcal{L}(x, y; \theta) = -\log \sum_{l \in \text{Align}(x,y)} \prod_t^T p_{ctc}(l_t | x; \theta) \tag{9}$$

where Align (x, y) is the set of all possible alignments of the characters of the transcription y to frames of input x under the CTC operator. In equation 9, the inner term is a product over time-steps of the sequence, which shrinks with the length of the sequence since $p_{ctc}(l_t|x;\theta)<1$. This motivates embodiments of curriculum learning strategy, which may be referred herein as "SortaGrad". SortaGrad uses the length of the utterance as a heuristic for difficulty, since long utterances have higher cost than short utterances.

A method of training a RNN model using a curriculum learning strategy according to embodiments of the present invention is presented below. For a training set comprising a plurality of minibatches with each minibatch comprising a plurality of utterances, the training set is iterated through, in a first training epoch, in an increasing order of the length of the longest utterance in each minibatch. After the first training epoch, training may revert to a random order over minibatches (e.g., using stochastic training for one or more subsequent epochs).

In embodiments, the abovementioned curriculum learning strategy may be implemented in combination with one or more other strategies for speech recognition.

TABLE 1

Comparison of WER on a training and development set with and without SortaGrad, and with and without batch normalization.

|  | Train | | Dev | |
| --- | --- | --- | --- | --- |
|  | Baseline | BatchNorm | Baseline | BatchNorm |
| Not Sorted | 10.71 | 8.04 | 11.96 | 9.78 |
| Sorted | 8.76 | 7.68 | 10.83 | 9.52 |

Table 1 shows a comparison of training cost with and without SortaGrad on the 9 layer model with 7 recurrent layers. This effect is particularly pronounced for embodiments of networks without BatchNorm, since they are numerically less stable. In some sense the two techniques substitute for one another, though gains are still found when applying SortaGrad and BatchNorm together. Even with BatchNorm it is found that this curriculum improves numerical stability and sensitivity to small changes in training. Numerical instability can arise from different transcendental function implementations in the CPU and the GPU, especially when computing the CTC cost. The SortaGrad curriculum embodiments give comparable results for both implementations.

These benefits, likely occur primarily because long utterances tend to have larger gradients, yet a fixed learning rate independent of utterance length is used in embodiments. Furthermore, longer utterances are more likely to cause the internal state of the RNNs to explode at an early stage in training.

D.3 Comparison of Simple RNNs and GRUs

The models having been shown so far are simple RNNs that have bidirectional recurrent layers with the recurrence for both the forward in-time- and backward-in-time directions modeled by Equation 3. Current research in speech and language processing has shown that having a more complex recurrence may allow the network to remember state over more time-steps while making them more computationally expensive to train. Two commonly used recurrent architectures are the Long Short-Term Memory (LSTM) units and the Gated Recurrent Units (GRU), though many other variations exist. A recent comprehensive study of thousands of variations of LSTM and GRU architectures showed that a GRU is comparable to an LSTM with a properly initialized forget gate bias, and their best variants are competitive with each other. GRUs were examined because experiments on smaller data sets showed the GRU and LSTM reached similar accuracy for the same number of parameters, but the GRUs were faster to train and less likely to diverge.

In embodiments, the GRUs being used are computed by $$z_t = \sigma(W_z x_t + U_z h_{t-1} + b_z)$$

$$r_t = \sigma(W_r x_t + U_r h_{t-1} + b_r)$$

$$\tilde{h}_t = f(W_h x_t + r_t \circ U_h h_{t-1} + b_h)$$

$$h_t = (1-z_t) h_{t-1} + z_t \tilde{h}_t \quad (10)$$

where $\sigma(\cdot)$ is the sigmoid function, z and r represent the update and reset gates respectively, and the layer superscripts are dropped for simplicity. Embodiments of this GRU differ from a standard GRU in that the hidden state $h_{t-1}$ is multiplied by $U_h$ prior to scaling by the reset gate. This allows for all operations on $h_{t-1}$ to be computed in a single matrix multiplication. The output nonlinearity $f(\cdot)$ is typically the hyperbolic tangent function tan h. However, in embodiments, similar performance is found for tan h and clipped-ReLU nonlinearities. In embodiments, the clipped-ReLU is chosen to use for simplicity and uniformity with the rest of the network.

Table 2 shows comparison of development set WER for networks with either simple RNN or GRU, for various depths. All models have batch normalization, one layer of 1D-invariant convolution, and approximately 38 million parameters.

TABLE 2

Comparison of development set WER for networks with simple RNN or GRU

| Architecture | Simple RNN | GRU |
| --- | --- | --- |
| 5 layers, 1 Recurrent | 14.40 | 10.53 |
| 5 layers, 3 Recurrent | 10.56 | 8.00 |
| 7 layers, 5 Recurrent | 9.78 | 7.79 |
| 9 layers, 7 Recurrent | 9.52 | 8.19 |

Both GRU and simple RNN architectures benefit from batch normalization and show strong results with deep networks. However, Table 2 shows that for a fixed number of parameters, the GRU architectures achieve better WER for all network depths. This is clear evidence of the long-term dependencies inherent in the speech recognition task present both within individual words and between words. Even simple RNN embodiments are able to implicitly learn a language model due to the large amount of training data. Interestingly, the GRU network embodiments with 5 or more recurrent layers do not significantly improve performance. This is attributed to the thinning from 1728 hidden units per layer for 1 recurrent layer to 768 hidden units per layer for 7 recurrent layers, to keep the total number of parameters constant.

The GRU network embodiments outperformed the simple RNN embodiments in Table 3. However, in later results, it is found that as the model size may be scaled up, for a fixed computational budget the simple RNN networks perform slightly better.

D.4 Frequency Convolutions

Temporal convolution is commonly used in speech recognition to efficiently model temporal translation invariance for variable length utterances. This type of convolution was first proposed for neural networks in speech more than 25 years ago. Many neural network speech models have a first layer that processes input frames with some context window. This may be viewed as a temporal convolution with a stride of one.

Additionally, sub-sampling helps make recurrent neural networks computationally tractable with high sample-rate audio. A prior deep speech system accomplished this through the use of a spectrogram as input and temporal convolution in the first layer with a stride parameter to reduce the number of time-steps, as described in U.S. patent application Ser. No. 14/735,002, filed on 9 Jun. 2015, entitled "SYSTEMS AND METHODS FOR SPEECH TRANSCRIPTION," which is incorporated by reference herein in its entirety.

Convolutions in frequency and time domains, when applied to the spectral input features prior to any other processing, can slightly improve ASR performance. Convolution in frequency attempts to model spectral variance due to speaker variability more concisely than what is possible with large fully connected networks. In embodiments, since spectral ordering of features is removed by fully-connected and recurrent layers, frequency convolutions work better as the first layers of the network.

Embodiments with between one and three layers of convolution were explored. These convolution layers may be in the time-and-frequency domain (2D invariance) and in the time-only domain (1D invariance). In all cases, a same convolution was used, preserving the number of input features in both frequency and time. In embodiments, a stride across either dimension was specified to reduce the size of the output. In embodiments, the number of parameters was not explicitly controlled, since convolutional layers add a small fraction of parameters to the networks. All networks shown in Table 3 have about 35 million parameters.

TABLE 3

Comparison of WER for various arrangements of convolutional layers. In all cases, the convolutions are followed by 7 recurrent layers and 1 fully connected layer. For 2D-invariant convolutions the first dimension is frequency and the second dimension is time. All models have BatchNorm, SortaGrad, and 35 million parameters.

| Architecture | Channels | Filter dimension | Stride | Regular Dev | Noisy Dev |
|---|---|---|---|---|---|
| 1-layer 1D | 1280 | 11 | 2 | 9.52 | 19.36 |
| 2-layer 1D | 640, 640 | 5, 5 | 1, 2 | 9.67 | 19.21 |
| 3-layer 1D | 512, 512, 512 | 5, 5, 5 | 1, 1, 2 | 9.20 | 20.22 |
| 1-layer 2D | 32 | 41 × 11 | 2 × 2 | 8.94 | 16.22 |
| 2-layer 2D | 32, 32 | 41 × 11, 21 × 11 | 2 × 2, 2 × 1 | 9.06 | 15.71 |
| 3-layer 2D | 32, 32, 96 | 41 × 11, 21 × 11, 21 × 11 | 2 × 2, 2 × 1, 2 × 1 | 8.61 | 14.74 |

Results of the various embodiments are reported on two datasets—a development set of 2048 utterances ("Regular Dev") and a much noisier dataset of 2048 utterances ("Noisy Dev") randomly sampled from the CHiME 2015 development datasets. It was found that multiple layers of 1D-invariant convolutions provide a very small benefit. Embodiments with 2D-invariant convolutions improve results substantially on noisy data, while providing a small benefit on clean data. The change from one layer of 1D-invariant convolution to three layers of 2D-invariant convolution improves WER by 23.9% on the noisy development set.

D.5 Striding

In embodiments, in the convolutional layers, a longer stride and wider context are applied to speed up training as fewer time-steps are required to model a given utterance. Downsampling the input sound (through Fast Fourier Transforms and convolutional striding) reduces the number of time-steps and computation required in the following layers, but at the expense of reduced performance.

A method for striding data according to embodiments of the present invention is presented below. In embodiments, processing time may be shorten for the recurrent layers by taking strides of a step size of q time slices (e.g., step size of 2) in the original input so that the unrolled RNN has fewer steps.

In the Mandarin model embodiments, striding is employed in a straightforward way. However, in the English model embodiments, striding may reduce accuracy simply because the output of the network requires at least one time-step per output character, and the number of characters in English speech per time-step is high enough to cause problems when striding. It should be noted that Chinese characters are more similar to English syllables than English characters. This is reflected in the training data, where there are on average 14.1 characters/s in English, while only 3.3 characters/s in Mandarin. Conversely, the Shannon entropy per character as calculated from occurrence in the training set, is less in English due to the smaller character set—4.9 bits/char compared to 12.6 bits/char in Mandarin. This implies that spoken Mandarin has a lower temporal entropy density, ~41 bits/s compared to ~58 bits/s, and can thus more easily be temporally compressed without losing character information. To overcome this, the English alphabet may be enriched in step 610 with symbols representing alternate labellings, such as whole words, syllables, or non-overlapping n-grams. In embodiments, non-overlapping bi-graphemes or bigrams are used, since these are simple to construct, unlike syllables, and there are few of them compared to alternatives such as whole words. In embodiments, unigram labels are transformed into bigram labels through a simple isomorphism.

Non-overlapping bigrams shorten the length of the output transcription and thus allow for a decrease in the length of the unrolled RNN. In embodiments, an isomorphism may be, for example, as follows—the sentence "the cat sat" with non-overlapping bigrams is segmented as [th, e, space, ca, t, space, sa, t]. Notice that, in embodiments, for words with odd number of characters, the last character becomes a unigram and space is treated as a unigram as well. This isomorphism ensures that the same words are always composed of the same bigram and unigram tokens. The output set of bigrams consists of all bigrams that occur in the training set.

Table 4 shows results for embodiments of both bigram and unigram systems for various levels of striding, with or without a language model. It is observed that bigrams allow for larger strides without any sacrifice in the word error rate. This allows embodiments with reduced number of time-steps of the unrolled RNN, benefiting both computation and memory usage.

TABLE 4

Comparison of World Error Rate (WER) with different amounts of striding for unigram and bigram outputs on a model with 1 layer of 1D-invariant convolution, 7 recurrent layers, and 1 fully connected layer. All models have BatchNorm, SortaGrad, and 35 million parameters. The models are compared on a development set with and without the use of a 5-gram language model:

| | Dev no LM | | Dev LM | |
|---|---|---|---|---|
| Stride | Unigrams | Bigrams | Unigrams | Bigrams |
| 2 | 14.93 | 14.56 | 9.52 | 9.66 |
| 3 | 15.01 | 15.60 | 9.65 | 10.06 |
| 4 | 18.86 | 14.84 | 11.92 | 9.93 |

D.6 Row Convolution and Unidirectional Models Frequency

Bidirectional RNN models are challenging to deploy in an online, low-latency setting, because they are built to operate on an entire sample, and so it is not possible to perform the transcription process as the utterance streams from the user. Presented herein are embodiments of a unidirectional architecture that perform as well as bidirectional models. This allows unidirectional, forward-only RNN layers to be used in a deployment system embodiment.

Figure 14:
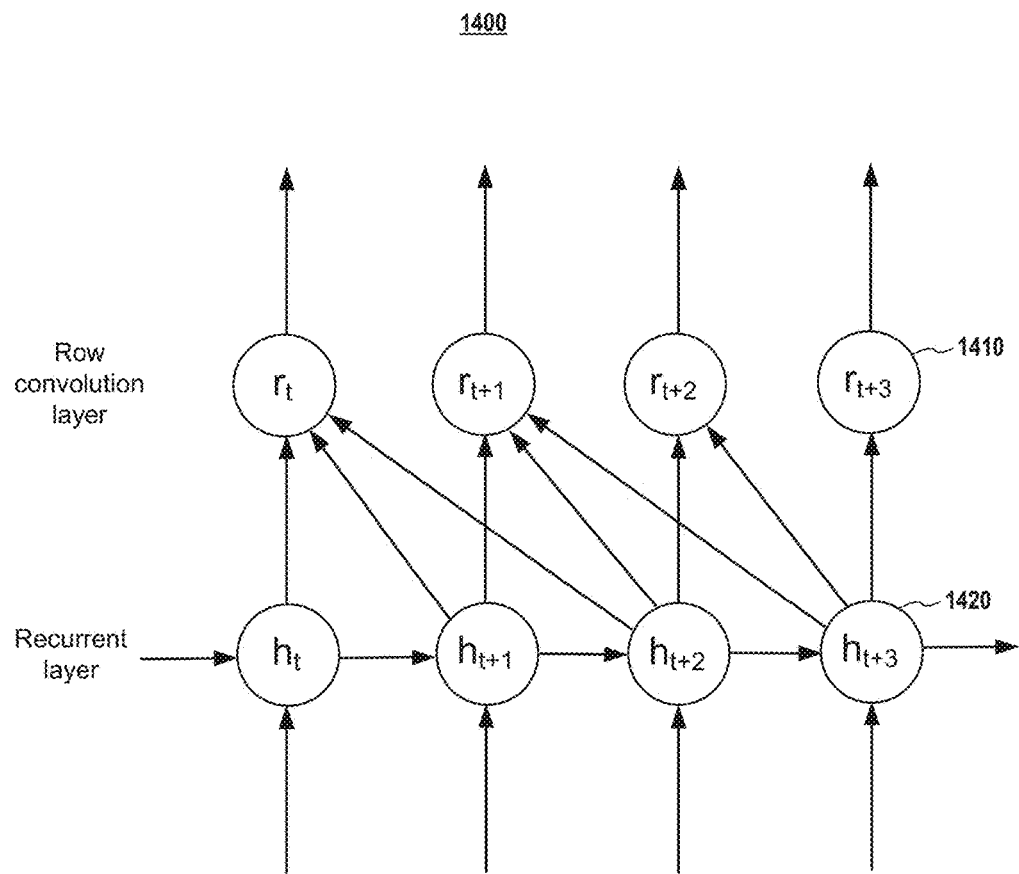
FIG. 14 depicts a row convolution architecture with future context size of 2 according to embodiments of the present disclosure.

To accomplish this, in embodiments, a special layer (row convolution) is employed, as shown in FIG. 14, which depicts a row convolution architecture with future context size of 2 according to embodiments of the present disclosure. In FIG. 14, the row convolution layer 1410 is placed above all recurrent layers (e.g., 1420). The intuition behind this layer is that a small portion of future information is only needed to make an accurate prediction at the current time-step. Suppose at time-step t, future contexts of $\tau$ steps are used. This yields a feature matrix $h_{t:t+\tau}=[h_t, h_{t+1}, \ldots, h_{t+\tau}]$ of size $d \times (\tau+1)$. A parameter matrix W of the same size as $h_{t:t+\tau}$ is defined. The activations $r_t$ for the new layer at time-step t are $$r_{t,i} = \sum_{j=1}^{\tau+1} W_{i,j} h_{t+j-1,i}, \text{ for } 1 \leq i \leq d \qquad (11)$$

where i represents an index of neuron in the current layer and d represents the number of neurons in the current layer. Since the convolution-like operation in Eq. 11 is row oriented for both W and $h_{t:t+\tau}$, this layer is called row convolution.

A method for audio transcription with a unidirectional RNN model according to embodiments of the present invention is presented below. In embodiment, a row convolution layer is placed above all recurrent layers of the RNN model. This has two advantages. First, this allows streaming of all computation below the row convolution layer on a finer granularity given little future context is needed. Second, this results in better Character Error Rate compared to the best bidirectional model for Mandarin. In embodiments, an activation of the row convolution layer is obtained using information of the recurrent layers at current time step and at least one future time step. It appears that the recurrent layers have learned good feature representations, so the row convolution layer simply gathers the appropriate information to feed to the classifier.

D.7 Language Model

Embodiments of the RNN models are trained over millions of unique utterances, which enable the network to learn a powerful implicit language model. Some of the best models are quite adept at spelling, without any external language constraints. Further, in the development datasets, many cases are found where embodiments could implicitly disambiguate homophones—for example, "he expects the Japanese agent to sell it for two hundred seventy-five thousand dollars". Nevertheless, the labeled training data is small compared to the size of unlabeled text corpora that are available. Thus, it was found that WER improves when embodiments of the system are supplemented with a language model trained from external text.

A method for constraining output of model using a language model according to embodiments of the present invention is presented below. In embodiments, predicted character(s) output for an utterance, x, is obtained from the RNN model. Given the output of the RNN model or models, a search may be performed to find the transcription y that is most probable according to both the RNN output and a language model which interprets the transcription as words.

In embodiments, the language model is an external language model. The external language model may be an n-gram language model since they scale well to large amounts of unlabeled text. For English, in embodiments, the language model is a Kneser-Ney smoothed 5-gram model with pruning that is trained using the KenLM toolkit on cleaned text from the Common Crawl Repository. The vocabulary is the most frequently used 400,000 words from 250 million lines of text, which produces a language model with about 850 million n-grams. For Mandarin, in embodiments, the language model is a Kneser-Ney smoothed character level 5-gram model with pruning that is trained on an internal text corpus of 8 billion lines of text. This produces a language model with about 2 billion n-grams. A character level language model may be needed in Mandarin as words are not usually segmented in text.

In embodiments, the search for transcription y is to maximize Q(y) shown in Equation 12, which is a linear combination of logarithm probabilities from the CTC trained network and language model, along with a word insertion term:

$$Q(y) = \log(p_{ctc}(y|x)) + \alpha \log(p_{lm}(y)) + \beta \text{word\_count}(y) \qquad (12)$$

The weight $\alpha$ controls the relative contributions of the language model and the CTC network. The weight $\beta$ encourages more words in the transcription. These parameters are tuned on a development set. In embodiments, a beam search is used to find the optimal transcription.

Table 5 shows that an external language model helps both English and Mandarin speech systems. The relative improvement given by the language model drops from 48% to 36% in English and 27% to 23% in Mandarin, from a model with 5 layers and 1 recurrent layer to a model with 9 layers and 7 recurrent layers. It is hypothesized that the network builds a stronger implicit language model with more recurrent layers.

TABLE 5

Comparison of WER for English and CER for Mandarin with and without a language model. These are simple RNN models with only one layer of 1D invariant convolution.

| Language | Architecture | Dev no LM | Dev LM |
| --- | --- | --- | --- |
| English | 5-layer, 1 RNN | 27.79 | 14.39 |
| English | 9-layer, 7 RNN | 14.93 | 9.52 |
| Mandarin | 5-layer, 1 RNN | 9.80 | 7.13 |
| Mandarin | 9-layer, 7 RNN | 7.55 | 5.81 |

The relative performance improvement from a language model is higher in English than in Mandarin. This is attributed to the fact that a Chinese character represents a larger block of information than an English character. For example, if syllables or words in English are output directly, the model would make fewer spelling mistakes and the language model would likely helpless.

Returning to FIG. 11, in embodiments, the module 1100 may comprise one or more computer device interfaces 1125 for allowing the user interface module to access and use system resources of the computing device. For example, the user interface module may access the microphone to turn it on or off based upon inputs received from the user via the graphical user interface.

In embodiments, the module 1100 may comprise one or more application programming interfaces 1130 that allow the user interface module 1100 to be used by, or to interface with, one or more other applications to be a user input means for those programs. For example, a user interface like that shown in FIG. 1 may be used as the input for a searching application, a text messaging application, a word processing application, system operations or interactions, etc.

One skilled in the art shall recognize that one or more of the modules in user interface module 1110 may not be present in the module, but rather, may be a module/service provided by the computing system and accessed by the user interface module 1100.

Components, or modules, shown in diagrams are illustrative of exemplary embodiments of the invention and are meant to avoid obscuring the invention. It shall also be understood that components may be described as separate functional units, which may comprise sub-units, but those skilled in the art will recognize that various components, or portions thereof, may be divided into separate components or may be integrated together, including integrated within a single system or component. It should be noted that other functions or operations discussed herein may be implemented as components. Components may be implemented in non-transitory software, hardware, or a combination thereof.

Also, additional or fewer connections may be used. It shall also be noted that the terms "coupled," "connected," or "communicatively coupled" shall be understood to include direct connections, indirect connections through one or more intermediary devices, and wireless connections.

Furthermore, connections between components or systems within the figures are not intended to be limited to direct connections, and may not be expressly displayed. Rather, data between these components may be modified, re-formatted, or otherwise changed by intermediary components.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It shall also be noted that elements of the claims, below, may be arranged differently including having multiple dependencies, configurations, and combinations.

The invention claimed is:

1. A non-transitory computer-readable medium or media comprising one or more sequences of instructions which, when executed by one or more processors, causes the steps to be performed comprising:

presenting on a touch-sensitive display of a computing device a graphical user interface for voice input, the graphical user interface comprising:

a voice input button that, when selected by a user, causes audio input for transcription to be received via a microphone of the computing device, which transcription is displayed in a display portion that displays text of the transcription, wherein at least a portion of the audio input is submitted to a trained neural network that uses a set of spectrogram frames that represent the at least a portion of the audio input to output a set of transcribed characters corresponding to character probabilities predicted by the trained neural network;

a trackpad portion that is configured to receive via the touch-sensitive display one or more gestures from the user; and a navigation portion that displays a plurality of buttons, each button, when selected by the user via the touch-sensitive display, activates a function associated with that button, at least one of the buttons, when activated causes an alphabet keyboard to be displayed to the user that facilitates input of text by the user.

2. The non-transitory computer-readable medium or media of claim 1 wherein the navigation portion that displays a plurality of buttons further comprises at least one button, when activated cause a user-configurable setting display to be presented that facilitates input from the user to allow the user to customize at least a portion of the graphical user interface.

3. The non-transitory computer-readable medium or media of claim 1 wherein the display portion represents at least a portion of the touch-sensitive display.

4. The non-transitory computer-readable medium or media of claim 1 further comprising one or more sequences of instructions which, when executed by one or more processors, causes the steps to be performed comprising:

responsive to receiving a first-type input swipe via the touch-sensitive display in the trackpad portion, moving a cursor in a display portion corresponding to movement of the first-type input swipe, the cursor in the display portion moving in a word-to-word manner, one word at a time and selecting the word at which the cursor is positioned as it moves such that any previous word traversed by the cursor during movement of the first-type input swipe is no longer selected.

5. The non-transitory computer-readable medium or media of claim 4 wherein a word being selected is indicated in the display portion by at least one of being highlighted, having its font type changed, having its font color changed, having its background changed, or a combination thereof.

6. The non-transitory computer-readable medium or media of claim 5 further comprising one or more sequences of instructions which, when executed by one or more processors, causes the steps to be performed comprising:

responsive to a word being selected, cancelling the selection of the word responsive to receiving another first-type input or a second-type input via the touch-sensitive display.

7. The non-transitory computer-readable medium or media of claim 1 further comprising one or more sequences of instructions which, when executed by one or more processors, causes the steps to be performed comprising:

responsive to receiving a third-type input swipe via the touch-sensitive display in the trackpad portion, moving a cursor in a display portion corresponding to movement of the third-type input swipe, the cursor in the display portion selecting all the words traversed by the cursor from an initial cursor position to a final cursor position defined by the movement of the third-type input swipe.

8. The non-transitory computer-readable medium or media of claim 7 further comprising one or more sequences of instructions which, when executed by one or more processors, causes the steps to be performed comprising:

responsive to a user not contacting the touch-sensitive display having just previously performed a third-type input swipe via the touch-sensitive display in which a set of text was selected and responsive to receiving a subsequent third-type input swipe via the touch-sensitive display, altering the set of text that was selected based upon text traversed by the cursor from an initial cursor position to a final cursor position defined by the movement of the subsequent third-type input swipe.

9. A computer-implemented method for facilitating user input for a computing device, the method comprising:
presenting on a touch-sensitive display of a computing device a graphical user interface for voice input, comprising:
a voice input button that, when selected by a user, causes audio input for transcription to be received via a microphone of the computing device, which transcription is displayed in a display portion that displays text of the transcription, wherein at least a portion of the audio input is submitted to a trained neural network that uses a set of spectrogram frames that represent the at least a portion of the audio input to output a set of transcribed characters corresponding to character probabilities predicted by the trained neural network;
a trackpad portion that is configured to receive via the touch-sensitive display one or more gestures from the user; and
a navigation portion that displays a plurality of buttons, each button, when selected by the user via the touch-sensitive display, activates a function associated with that button, at least one of the buttons, when activated causes an alphabet keyboard to be displayed to the user that facilitates input of text by the user.

10. The computer-implemented method of claim 9 wherein the display portion is presented on at least a portion of the touch-sensitive display.

11. The computer-implemented method of claim 9 further comprising:
responsive to receiving a first-type input swipe via the touch-sensitive display in the trackpad portion, moving a cursor in a display portion corresponding to movement of the first-type input swipe, the cursor in the display portion moving in a word-to-word manner, one word at a time and selecting the word at which the cursor is positioned as it moves such that any previous word traversed by the cursor during movement of the first-type input swipe is no longer selected.

12. The computer-implemented method of claim 11 wherein a word being selected is indicated in the display portion by at least one of being highlighted, having its font type changed, having its font color changed, having its background changed, or a combination thereof.

13. The computer-implemented method of claim 12 further comprising:
responsive to a word being selected, cancelling the selection of the word responsive to receiving another first-type input or a second-type input via the touch-sensitive display.

14. The computer-implemented method of claim 9 further comprising:
responsive to receiving a third-type input swipe via the touch-sensitive display in the trackpad portion, moving a cursor in a display portion corresponding to movement of the third-type input swipe, the cursor in the display portion selecting all the words traversed by the cursor from an initial cursor position to a final cursor position defined by the movement of the third-type input swipe.

15. The computer-implemented method of claim 14 further comprising:
responsive to a user not contacting the touch-sensitive display having just previously performed a third-type input swipe via the touch-sensitive display in which a set of text was selected and responsive to receiving a subsequent third-type input swipe via the touch-sensitive display, altering the set of text that was selected based upon text traversed by the cursor from an initial cursor position to a final cursor position defined by the movement of the subsequent third-type input swipe.

16. A computing device comprising:
a touch-sensitive user interface configured to display at least a graphical user interface and to receive one or more inputs from a user;
a microphone;
a processing system, the processing system being configured to be in operative communication with the touch-sensitive user interface and with the microphone, the processing system being configured to perform the steps comprising:
causing a graphical user interface for user input to be presented on the touch-sensitive user interface of the computing device, the graphical user interface comprising:
a voice input button that, when selected by a user, causes at least a portion of audio input, which audio input is received via a microphone of the computing device, for transcription, which transcription is displayed in a display portion that displays text of the transcription, to be submitted to a trained neural network that uses a set of spectrogram frames that represent the at least a portion of the audio input to output a set of transcribed characters corresponding to character probabilities predicted by the trained neural network;
a trackpad portion that is configured to receive via the touch-sensitive user interface one or more gestures from the user; and
a navigation portion that displays a plurality of buttons, each button, when selected by the user via the touch-sensitive user interface, activates a function associated with that button, at least one of the buttons, when activated causes an alphabet keyboard to be displayed to the user that facilitates input of text by the user.

17. The computing device of claim 16 wherein the display portion represents at least a portion of the touch-sensitive user interface.

18. The computing device of claim 16 wherein the processing system is further configured to cause the step to be performed comprising:
responsive to receiving a first-type input swipe via the touch-sensitive user interface in the trackpad portion, moving a cursor in a display portion corresponding to movement of the first-type input swipe, the cursor in the display portion moving in a word-to-word manner, one word at a time and selecting the word at which the cursor is positioned as it moves such that any previous word traversed by the cursor during movement of the first-type input swipe is no longer selected.

19. The computing device of claim 16 wherein the processing system is further configured to cause the step to be performed comprising:
using the graphical user interface as in interface for a plurality of applications operating on the computing device.

20. The computing device of claim 16 wherein the processing system is further configured to cause the step to be performed comprising:

altering which buttons comprise the plurality of buttons in the navigation portion based upon usage by the user.

\* \* \* \* \*